US012497826B1

(12) United States Patent
Flannery et al.

(10) Patent No.: US 12,497,826 B1
(45) **Date of Patent: *Dec. 16, 2025**

(54) EXPANDABLE BARRIER WITH MATCHING PANELS AND CORNER PET DOOR

(71) Applicant: Carlson Pet Products, Inc., Burnsville, MN (US)

(72) Inventors: Mark A. Flannery, Longboat Key, FL (US); Porter R. Million, Minneapolis, MN (US)

(73) Assignee: Carlson Pet Products, Inc., Longboat Key, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,983

(22) Filed: Nov. 25, 2023

Related U.S. Application Data

(63) Continuation of application No. 17/958,304, filed on Sep. 30, 2022, now Pat. No. 11,828,105, which is a continuation of application No. 16/231,490, filed on Dec. 22, 2018, now Pat. No. 11,459,817, which is a continuation of application No. 15/428,127, filed on Feb. 8, 2017, now Pat. No. 10,161,181, which is a continuation of application No. 14/846,977, filed on Sep. 7, 2015, now Pat. No. 9,567,798, which is a continuation of application No. 13/971,829, filed on Aug. 20, 2013, now Pat. No. 9,127,496.

(51) Int. Cl.

| | |
|---|---|
| ***E06B 9/02*** | (2006.01) |
| ***E06B 7/32*** | (2006.01) |
| ***E06B 9/06*** | (2006.01) |
| ***E06B 11/02*** | (2006.01) |
| ***E06B 9/00*** | (2006.01) |

(52) U.S. Cl.
CPC .................. *E06B 9/02* (2013.01); *E06B 7/32* (2013.01); *E06B 9/06* (2013.01); *E06B 11/021* (2013.01); *E06B 2009/002* (2013.01)

(58) Field of Classification Search
CPC ..... E06B 9/02; E06B 9/06; E06B 7/32; E06B 11/021; E06B 2009/002
See application file for complete search history.

(56) References Cited

U.S. PATENT DOCUMENTS

| | | | | |
|---|---|---|---|---|
| 270,309 | A | 1/1883 | Harrison | |
| 1,189,410 | A | 7/1916 | Van Every | |
| 1,242,757 | A | 10/1917 | Anway | |
| 1,511,455 | A | 10/1924 | Freyberg et al. | |
| 1,542,151 | A | 6/1925 | Lehtonen | |
| 4,334,573 | A | 6/1982 | Hackman et al. | |
| 4,465,262 | A * | 8/1984 | Itri | E04H 17/166 49/55 |
| 4,583,715 | A | 4/1986 | Wright | |
| 4,611,431 | A | 9/1986 | Lauro | |
| 4,628,635 | A | 12/1986 | Maillard | |
| 4,685,247 | A | 8/1987 | Alam | |

(Continued)

*Primary Examiner* — Justin B Rephann

(57) ABSTRACT

A barrier for a home is disclosed. The barrier includes two portions that are quickly slideable relative to each other to take expanded and contracted forms. The barrier includes a metal frame and wood panels engaged in the metal frame. Each of the two portions includes at least one wood panel such that, when the barrier portions are slid to and away from each other, the wood panels slide to and away from each other. The barrier includes a corner pet door that opens in the expanded or contracted forms.

17 Claims, 6 Drawing Sheets

(56) References Cited

U.S. PATENT DOCUMENTS

| | | | |
|---|---|---|---|
| 4,777,765 | A * | 10/1988 | Johnson, Jr. .............. E06B 9/02 49/55 |
| 5,070,647 | A | 12/1991 | Spialter |
| 5,081,723 | A | 1/1992 | Saunders |
| 5,117,585 | A | 6/1992 | Andrisin, III |
| 5,367,829 | A | 11/1994 | Crossley |
| 5,528,859 | A | 6/1996 | Taylor |
| 5,535,550 | A | 7/1996 | Yang |
| 5,535,552 | A | 7/1996 | Stem |
| 5,829,505 | A | 11/1998 | Brescia |
| 6,301,832 | B1 * | 10/2001 | Andersen ............. A01K 1/0017 49/57 |
| 6,347,483 | B1 | 2/2002 | Andersen |
| 6,446,395 | B2 | 9/2002 | Rogers |
| 6,499,254 | B2 | 12/2002 | Rossman et al. |
| 6,681,720 | B1 | 1/2004 | Skurdalsvold et al. |
| 7,568,449 | B2 | 8/2009 | Hirokawa et al. |
| 7,950,184 | B2 | 5/2011 | Flannery |
| 7,954,456 | B2 | 6/2011 | Hirokawa et al. |
| 7,975,431 | B2 | 7/2011 | Flannery |
| 8,141,517 | B2 | 3/2012 | Shimoda et al. |
| 8,230,816 | B2 | 7/2012 | Hirokawa et al. |
| 8,261,490 | B2 | 9/2012 | Flannery |
| 8,418,407 | B2 | 4/2013 | Wang |
| 8,448,381 | B2 | 5/2013 | Flannery |
| 8,561,349 | B2 | 10/2013 | Flannery et al. |
| 8,607,502 | B2 | 12/2013 | Flannery et al. |
| 9,127,496 | B1 | 9/2015 | Flannery |
| 9,260,910 | B1 | 2/2016 | Flannery |
| 9,382,740 | B2 | 7/2016 | Flannery |
| 9,382,750 | B1 | 7/2016 | Flannery |
| 9,945,176 | B2 | 4/2018 | Flannery |
| 2003/0009945 | A1 | 1/2003 | Cheng |
| 2006/0169217 | A1 | 8/2006 | Glassford |
| 2007/0074453 | A1 | 4/2007 | Flannery |
| 2008/0134584 | A1 | 6/2008 | McGhee |
| 2008/0265233 | A1 | 10/2008 | Flannery |
| 2009/0178624 | A1 | 7/2009 | Hirokawa et al. |
| 2009/0293363 | A1 | 12/2009 | Flannery |
| 2010/0083577 | A1 | 4/2010 | Flannery et al. |
| 2012/0233922 | A1 | 9/2012 | Flannery et al. |
| 2012/0235101 | A1 | 9/2012 | Flannery et al. |
| 2012/0324796 | A1 | 12/2012 | Wang |
| 2013/0014703 | A1 | 1/2013 | Flannery et al. |
| 2013/0160365 | A1 | 6/2013 | Flannery et al. |

* cited by examiner

EXPANDABLE BARRIER WITH MATCHING PANELS AND CORNER PET DOOR

This application is a continuation of U.S. patent application Ser. No. 17/958,304 filed Sep. 30, 2022 (U.S. Pat. No. 11,828,105) and claims the benefit thereof under 35 U.S.C. § 120, which application is a continuation of U.S. patent application Ser. No. 16/231,490 filed Dec. 22, 2018 (U.S. Pat. No. 11,459,817) and claims the benefit thereof under 35 U.S.C. § 120, which application is a continuation of U.S. patent application Ser. No. 15/428,127 filed Feb. 8, 2017 (U.S. Pat. No. 10,161,181) and claims the benefit thereof under 35 U.S.C. § 120, which application is a continuation of U.S. patent application Ser. No. 14/846,977 filed Sep. 7, 2015 (U.S. Pat. No. 9,567,798) and claims the benefit thereof under 35 U.S.C. § 120, which application is a continuation of U.S. patent application Ser. No. 13/971,829 filed Aug. 20, 2013 (U.S. Pat. No. 9,127,496) and claims the benefit thereof under 35 U.S.C. § 120, all of which applications are hereby incorporated by reference in their entireties into this application.

FIELD OF THE INVENTION

The present invention relates generally to a barrier for a residence, particularly to a barrier with two sections that are slideable relative to each other such that the same barrier can be utilized to block off relatively large passageways and relatively small passageways, and specifically to such a barrier with one or more wood panels engaged in the metal frame of the barrier.

BACKGROUND OF THE INVENTION

A residence is a dwelling place or a home. A residence is where a person lives or resides. A residence is a domicile or habitation.

A residence may be a home to children. The children may be infants, toddlers, pre-schoolers, and children of elementary school age. Children of such age can fall down stairs. The top or bottom of a staircase may be blocked off with a residential gate.

A residence may be a home to pets such as cats and dogs. Dogs especially find trouble. Dogs are barred from certain areas of the house at certain times by residential gates.

Finally, a residence is a home to adults who enjoy the warm aesthetics that wood provides.

SUMMARY OF THE INVENTION

A feature of the present invention is the provision in a residential barrier for a passageway in a home, of a first barrier section disposed in generally a first plane, of a second barrier section disposed in generally a second plane, of the first and second barrier sections engaged to each other and slideable relative to each other in said first and second planes respectively, and of the first and second planes being parallel to each other.

Another feature of the present invention is the provision in a residential barrier for a passageway in a home, of a first barrier section including a first perimeter frame, with the first perimeter frame including a first top portion, a first inner end portion, a first outer end portion, and a first bottom portion, and of a second barrier section including a second perimeter frame, with the second perimeter frame including a second top portion, a second inner end portion, a second outer end portion, and a second bottom portion.

Another feature of the present invention is the provision in a residential barrier for a passageway in a home, of a first barrier section including a first elongate panel comprising wood or a wood product or a material having the appearance of wood that confronts and is spaced apart from a first top portion of a first perimeter frame, and of a second barrier section including a second elongate panel comprising wood or a material having the appearance of wood that confronts and is spaced apart from a second top portion of a second perimeter frame.

Another feature of the present invention is the provision in a residential barrier for a passageway in a home, of first and second barrier sections having respective first and second elongate panels aligned with each other such that, when the first and second barrier sections slide relative to one another, at least a portion of one elongate panel is hidden from view behind the other elongate panel, and such that at least a portion of one elongate panel comes face to face with another portion of the other elongate panel.

Another feature of the present invention is the provision in a residential barrier for a passageway in a home, of first and second barrier sections having respective first and second elongate panels that have the same height, width, and length.

Another feature of the present invention is the provision in a residential barrier for a passageway in a home, of a first barrier section including a first opening between a first elongate panel and a first top portion of a first perimeter frame, with the first opening being defined by a) the first top portion of the first perimeter frame; b) an intermediate horizontal member; c) the first inner end portion of the first perimeter frame; d) a vertical support member spaced inwardly of the first outer end portion of the first perimeter frame; and e) no vertical or horizontal support members extending through the first opening.

Another feature of the present invention is the provision in a residential barrier for a passageway in a home, of a first barrier section including first and second horizontal support members that are spaced apart from each other, that are parallel to each other, and that run outwardly from the first inner end portion toward the outer end portion of the first barrier section, with the first elongate panel being engaged between said first and second horizontal support members of the first barrier section, and of a second barrier section including first and second horizontal support members that are spaced apart from each other, that are parallel to each other, and that run outwardly from the second inner end portion toward the second outer end portion of the second barrier section, with the second elongate panel being engaged between said first and second horizontal support members of the second barrier section.

Another feature of the present invention is the provision in a residential barrier for a passageway in a home, of the first barrier section having a first elongate panel framed by metal and of the second barrier section having a second elongate panel framed by metal.

Another feature of the present invention is the provision in a residential barrier for a passageway in a home, of the first barrier section including a first corner panel, with the first corner panel including a material selected from the group of materials consisting of wood, a wood product, a wood synthetic material, artificial wood, or a composite wood product, with the first perimeter frame including four corner portions and with the first corner panel being in one of the four corner portions of the first barrier section, and of the second barrier section including a second corner panel, with the second corner panel comprising a material selected from the group of materials consisting of wood, a wood product, a wood synthetic material, artificial wood, or a composite wood product, with the second perimeter frame including four corner portions and with the second corner panel being in one of the four corner portions of the second perimeter frame.

Another feature of the present invention is the provision in a residential barrier for a passageway in a home, of the first top portion and first outer end portion of the first barrier section making up a first perimeter junction, with the first corner panel being adjacent the first perimeter junction, and of the second top portion and second outer end portion of the second barrier section making up a second perimeter junction, with the second corner panel being adjacent the second perimeter junction.

Another feature of the present invention is the provision in a residential barrier for a passageway in a home, of the first barrier section including a first cross junction of vertical and horizontal support members, with the first elongate panel having a first corner adjacent the first cross junction, with the first corner panel having a first corner adjacent the first cross junction, with the first elongate panel and first corner panel being disposed at different heights, and of the second barrier section including a second cross junction of vertical and horizontal support members, with the second elongate panel having a second corner adjacent the second cross junction, with the second corner panel having a second corner adjacent the second cross junction, with the second elongate panel and second corner panel being disposed at different heights Another feature of the present invention is the provision in a residential barrier for a passageway in a home, of the first barrier section including a first intermediate horizontal support member running from the first inner end portion of the first perimeter frame to the first outer end portion of the first perimeter frame, with the first elongate panel being disposed above the first intermediate horizontal support member, with a gate being disposed in the first barrier section below the first intermediate horizontal support member.

Another feature of the present invention is the provision in a residential barrier for a passageway in a home, of the first top portion of the first perimeter frame and the first outer end portion of the first perimeter frame making up a first corner junction, and wherein the first barrier section includes a first corner panel engaged adjacent to the first corner junction, with the first corner junction being disposed above the first intermediate horizontal support member and above the first elongate panel of the first barrier section, and of the second top portion of the second perimeter frame and the second outer end portion of the second perimeter frame making up a second corner junction, and wherein the second barrier section includes a second corner panel engaged adjacent to the second corner junction, with the second corner junction being disposed above the second intermediate horizontal support member and above the second elongate panel of the second barrier section.

Another feature of the present invention is the provision in a residential barrier for a passageway in a home, of the first top portion of the first perimeter frame and the first outer end portion of the first perimeter frame making up a first corner junction, of the first barrier section including a first corner panel engaged adjacent to the first corner junction, with the first corner junction being disposed above the first intermediate horizontal support member and outwardly of the first elongate panel of the first barrier section, and of the second top portion of the second perimeter frame and the second outer end portion of the second perimeter frame making up a second corner junction, of the second barrier section including a second corner panel engaged adjacent to the second corner junction, with the second corner junction being disposed above the second intermediate horizontal support member and outwardly of the second elongate panel of the second barrier section.

Another feature of the present invention is the provision in a residential barrier for a passageway in a home, of the first barrier section including a gate, with the gate being swingable to a front of the barrier section, with the gate when swingable to a front of the barrier section providing a gate opening to the first barrier section to permit a pet to pass through the gate opening, of the first barrier section and second barrier section having a fully retracted position where the second barrier section slides adjacent to a rear of the first barrier section, and where the second barrier section when said barriers are in the fully retracted position closes off a portion of the gate opening such that a remaining portion of the gate opening is open to permit a pet to pass through said remaining portion.

Another feature of the present invention is the provision in a residential barrier for a passageway in a home, of the first elongate panel including an upper edge that tapers in a downward and lateral direction, an inner edge that tapers in an outward and lateral direction, a lower edge that tapers in an upward and lateral direction, an outer edge that tapers in an inward and lateral direction, and a generally flat face extending to and between the upper, inner, lower and outer edges.

Another feature of the present invention is the provision in a residential barrier for a passageway in a home, of a first barrier section disposed in generally a first plane, of a second barrier section disposed in generally a second plane, with the first and second barrier sections engaged to each other and slideable relative to each other in said first and second planes respectively, with the first and second planes being parallel to each other, of the first barrier section including a first perimeter frame, with the first perimeter frame including a first top portion, a first inner end portion, a first outer end portion, and a first bottom portion, of the second barrier section including a second perimeter frame, with the second perimeter frame including a second top portion, a second inner end portion, a second outer end portion, and a second bottom portion, of the first barrier section including a first elongate panel comprising a material selected from the group of materials consisting of wood, a wood product, a wood synthetic material, artificial wood, a composite wood product, and a material having the appearance of wood, with the first elongate panel confronting and being spaced apart from the first top portion of the first perimeter frame, of the second barrier section including a second elongate panel comprising a material selected from the group of materials consisting of wood, a wood product, a wood synthetic material, artificial wood, a composite wood product, and a material having the appearance of wood, with the second elongate panel confronting and being spaced apart from the second top portion of the second perimeter frame, of the first top portion and first outer end portion of the first perimeter frame making up a first junction, with the first barrier section including a first corner panel adjacent the first junction, with the first corner panel comprising a material selected from the group of materials consisting of wood, a wood product, a wood synthetic material, artificial wood, a composite wood product, and a material having the appearance of wood; and of the second top portion and second outer end portion of the second perimeter frame making up a second junction, with the second barrier section including a second corner panel adjacent the second junction, with the second corner panel comprising a material selected from the group of materials consisting of wood, a wood product, a wood synthetic material, artificial wood, a composite wood product, and a material having the appearance of wood.

Another feature of the present invention is the provision in a residential barrier for a passageway in a home, of the first elongate panel being offset longitudinally from the first corner panel, and of the second elongate panel being offset longitudinally from the second corner panel.

Another feature of the present invention is the provision in a residential barrier for a passageway in a home, of the first elongate panel including an uppermost edge, of the first corner panel including a lowermost edge, and of the uppermost edge of the first elongate panel being disposed at a height lower than the lowermost edge of the first corner panel, of the second elongate panel including an uppermost edge, of the second corner panel including a lowermost edge, and of the uppermost edge of the second elongate panel being disposed at a height lower than the lowermost edge of the second corner panel.

Another feature of the present invention is the provision in a residential barrier for a passageway in a home, of the first corner panel including an inner and lower corner, of the first elongate panel including an outer and upper corner, and of the inner and lower corner of the first corner panel being adjacent to the outer and upper corner of the first elongate panel, of the first corner panel including an inner and lower corner, of the first elongate panel including an outer and upper corner, and of the inner and lower corner of the first corner panel being adjacent to the outer and upper corner of the first elongate panel.

An advantage of the present invention is aesthetics.

Another advantage of the present invention is that the present barrier is aesthetic relative to a barrier having exclusively columns of upright support members.

Another advantage of the present invention is a barrier that is aesthetically balanced with panel positions that mirror one another without regard to where the sliding barrier sections are with respect to one another.

Another advantage of the present invention is that pinching of the fingers is minimized. When columns of support members are sliding by other columns of support members, it may be easy to pinch fingers. However, when one elongate panel is sliding by another elongate panel, a pinching of the fingers is minimized. Or, when an empty space is sliding by another empty space, a pinching of the fingers is minimized.

Another advantage of the present invention is that the present barrier is simple and inexpensive to manufacture.

Another advantage of the present invention is that a portion of the barrier is formed of wood. Wood is warm. Wood is pleasant to look at. Wood is relatively light and adds little weight to the barrier such that the barrier is easy to carry, easy to set up, and easy to operate.

DESCRIPTION

Figure 1A:
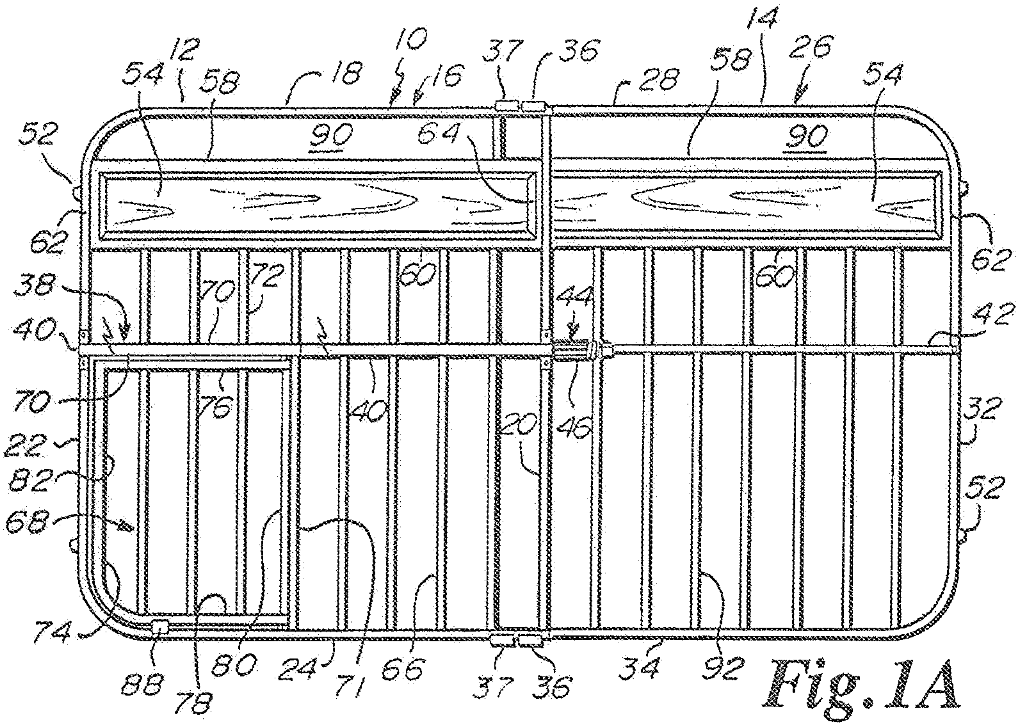
FIG. 1A is a front view of one embodiment of the present barrier in an expanded configuration.
Figure 1B:
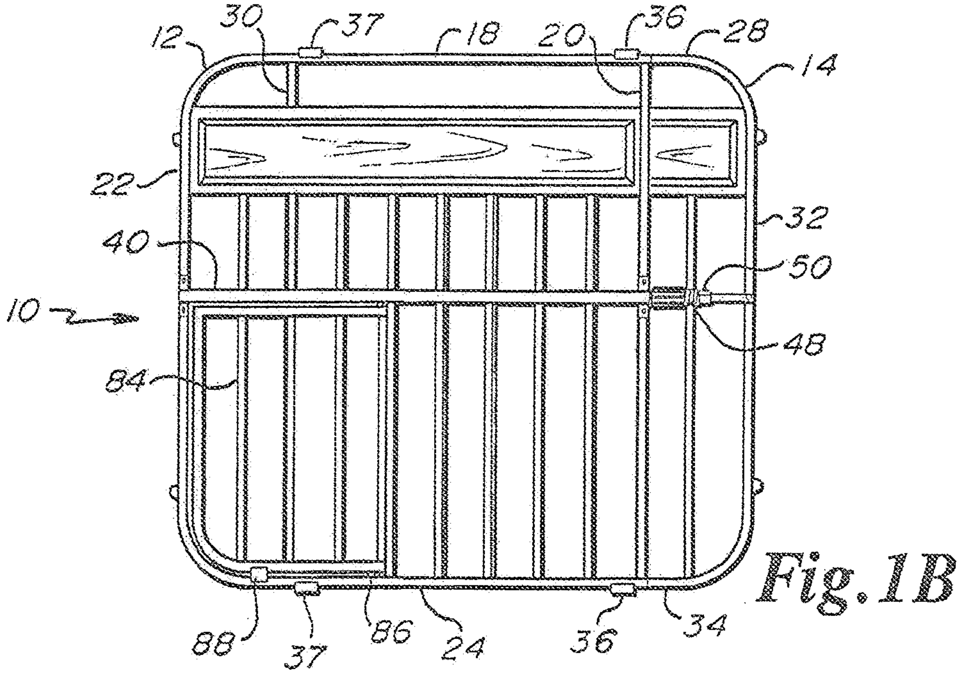
FIG. 1B is a front view of the barrier of FIG. 1A in a retracted configuration.

As shown in FIGS. 1A and 1B, a barrier 10 includes a first barrier section 12 and a second barrier section 14. Barrier section 12 includes a first perimeter frame 16 that includes a top portion 18, a first inner end portion 20, a first outer end portion 22, and a first bottom portion 24. Barrier section 14 includes a second perimeter frame 26 that includes a top portion 28, a second inner end portion 30, a second outer end portion 32, and a second bottom portion 34. A curved junction is provided between first top portion 18 and first outer end portion 22. A curved junction is provided between first bottom portion 24 and first outer end portion 22. A right angle junction is provided between first top portion 18 and first inner end portion 20. A right angle junction is provided between first bottom portion 24 and first inner end portion 20. A curved junction is provided between second top portion 28 and second outer end portion 32. A curved junction is provided between second bottom portion 34 and second outer end portion 32. A right angle junction is provided between second top portion 28 and second inner end portion 30. A right angle junction is provided between second bottom portion 34 and second inner end portion 30. Each of the barriers of FIGS. 1A, 1B, 2A, 2B, 3A, 3B, 4A, 4B, 5A and 5B have the structure of the first and second perimeter frames 16, 26.

First barrier section 12 is disposed in generally a first plane. Second barrier section 14 is disposed in generally a second plane. The first and second barrier sections 12, 14 are engaged to each other and slideable relative to each other by a set of four guides or connections 36, 37. Guides 36 are rigidly affixed to the first barrier section 12 and slideably retain second barrier section 14. Guides 37 are rigidly affixed to the second barrier section 14 and slideably retain first barrier section 12. Each of the guides 36, 37 extends between the top portions 18, 28 or the bottom portions 24, 34. As to a guide 36 or 37 that extends between the top portions 18, 28, such guide 36 or 37 is rigidly fixed to one of the top portions 18, 28 and slideably retains therein the other of the top portions 18, 28. As to a guide 36 or 37 that extends between the bottom portions 24, 34, such guide 36 or 37 is rigidly fixed to one of the bottom portions 24, 34 and slideably retains therein the other of the bottom portions 24, 34. As to the guides 36 and 37, the Flannery U.S. Patent Application Publication No. 2010/0083577 A1 published Apr. 8, 2010 and entitled Quickly Slideable And Incrementally Adjustable Barrier is hereby incorporated by reference in its entirety. Via the guides 36 and 37, the first and second barrier sections 12, 14 slide in their respective planes, with the respective planes being parallel to each other. Each of the barriers of FIGS. 1A, 1B, 2A, 2B, 3A, 3B, 4A, 4B, 5A and 5B have these guides 36 and 37.

A longitudinal direction herein is defined by the direction in which the barrier sections 12, 14 slide. Inner end portion 20 and outer end portion 22 are set apart in the longitudinal direction. A lateral direction herein is defined by a direction into and out of the face of barrier section 12 or the face of barrier section 14. Guides 36, 37 extend from barrier section 12 to barrier section 14 in the lateral direction. A height direction is defined herein by the direction in which inner end portion 20 runs. Top portion 18 and bottom portion 24 are set apart from each other in the height direction. These definitions of longitudinal, lateral, and height directions apply to each of the barriers of FIGS. 1A, 1B, 2A, 2B, 3A, 3B, 4A, 4B, 5A and 5B.

Barrier 10 includes a mechanism 38 that fixes and releases the barrier sections 12, 14 to and from each other in the longitudinal direction. Mechanism 38 includes an outer tube 40 that is engaged to and between first inner end portion 20 and first outer end portion 22 and an inner tube 42 that is fixed to second outer end portion 32 and that includes an inner free end that extends into outer tube 40. Outer tube 40 is set outwardly in the lateral direction of the support members of barrier section 12 so as to be spaced apart from such support members in the lateral direction. Inner tube 42 is set outwardly in the lateral direction of the support members of barrier section 14 so as to be spaced apart from such support members in the lateral direction. Inner tube 42 includes an upper face having a plurality of spaced apart holes. The mechanism 38 further includes a slide 44 that slides in the longitudinal direction on inner tube 42. Slide 44 includes a wheel 46, threads 48 on which the wheel 46 turns, and a drop pin 50 that engages the holes in the upper face of inner tube 42. In operation, drop pin 50 is raised out of one of the holes of the inner tube 42, and then the barrier sections 12, 14 are slid relative to one another. Then, when the desired width of the barrier 10 as a whole is attained (i.e., the distance between outer end portions 22 and 32), the slide 44 (including wheel 46, threads 48, and drop pin 50) is slid longitudinally on inner tube 42 to be adjacent to inner end portion 20 of first barrier section 12. Then the drop pin 50 is permitted to drop into a hole in the upper face of inner tube 42. To this point, the longitudinal adjustment of barrier 10 can be referred to as a macro adjustment. Then, after such macro adjustment, a fine adjustment commences. This fine adjustment includes turning wheel 46 on threads 48 until an inner face of wheel 46 makes contact with a structure on first barrier section 12 such as an inner face of outer tube 40. Further turning of wheel 46 incrementally draws the barrier sections 12, 14 apart so as to incrementally place further pressure on opposing vertically extending surfaces, such as door jambs, that are engaging bumpers 52 on the outer end portions 22, 32. To release the barrier 10 from between the door jambs, the wheel 46 is turned in the opposite direction and/or the drop pin 50 can be taken out of the hole in which the pin 50 is engaged in the upper surface of inner tube 42. As to mechanism 38, the Flannery U.S. Patent Application Publication No. 2010/0083577 A1 published Apr. 8, 2010 and entitled Quickly Slideable And Incrementally Adjustable Barrier is hereby incorporated by reference in its entirety. Each of the barriers of FIGS. 1A, 1B, 2A, 2B, 3A, 3B, 4A and 4B has this mechanism 38.

As shown in FIG. 1A, barrier section 12 includes a first elongate panel 54. First elongate panel 54 is wood, a wood product, a wood synthetic material, artificial wood, or a composite wood product such that the exterior of the panel 54 has the look and feel of natural wood. Barrier section 14 includes elongate panel 54, referred to as a second elongate panel. Each of the barrier sections of FIGS. 1A, 1B, 2A, 2B, 3A, 3B, 4A, 4B, 5A and 5B have at least one elongate panel that is wood, a wood product, a wood synthetic material, artificial wood, or a composite wood product such that the exterior of the elongate panel has the look and feel of natural wood.

First elongate panel 54 protrudes outwardly in the lateral direction from a face of the first side of barrier section 12, where the face is defined by a plane lying on the first sides of top portion 18, inner end portion 20, outer end portion 22, and bottom portion 24. The first side of barrier section 12 is shown in FIG. 1A. A second side of barrier section 12 is opposite the first side and first elongate panel 54 also protrudes outwardly in the lateral direction from a face of the second side of the barrier section 12, where the face is defined by a plane lying on the second sides of top portion 18, inner end portion 20, outer end portion 22 and bottom portion 24. As the first elongate panel 54 protrudes outwardly in the lateral direction, first elongate panel 54 tapers toward a center of the first elongate panel 54. In other words, the upper edge of panel 54 tapers downwardly, the inner edge tapers outwardly, the outer edge tapers inwardly, and the bottom edge tapers upwardly. The front face of panel 54 is flat. Each of the elongate panels of the barrier sections of FIGS. 1A, 1B, 2A, 2B, 3A, 3B, 4A, 4B, 5A, and 5B has such beveled or tapering features.

First barrier section 12 includes a pair of horizontal support members 58, 60. Support members 58, 60 run from inner support member 20 to outer support member 22 and are interconnected by vertical support members 62, 64. Vertical support member 62 confronts and is engaged to outer end portion 22. Vertical support member 64 confronts and is engaged to inner end portion 20. First elongate panel 54 is engaged between the support members 58, 60, 62, and 64. Support members 58, 60, 62, 64 may be referred to as a frame or metal frame of elongate panel 54. Second barrier section 14 also includes support members 58, 60, 62, and 64.

First barrier section 12 further includes a set of four vertical support members 66 running from bottom portion 24 to lower horizontal support member 60. Vertical support members 66 are disposed between a pet door 68 and the inner end portion 20. Vertical support members 66 are spaced equidistantly from each other.

First barrier section 12 further includes a horizontal support member 70 running inwardly from the outer end portion 22 to a vertical support member 71 that runs between bottom portion 24 and horizontal support member 70. Horizontal support member 70 is disposed between horizontal support member 60 and bottom portion 24. Horizontal support member 70 is disposed at the same height as outer tube 40. Tube 40 is shown broken apart in FIG. 1A such that horizontal support member 70 can be shown.

First barrier section 12 further includes a set of four vertical support members 72 running from horizontal support member 70 to the lower horizontal support member 60. Vertical support members 72 are disposed between the outermost vertical support member 66 and outer end portion 22. Vertical support members 72 are spaced equidistantly from each other. The innermost vertical support member 72 is vertically aligned with vertical support member 71.

Pet door 68 is engaged in an outer and lower corner of barrier section 12. Pet door 68 includes a perimeter frame 74 that includes a top portion 76, a bottom portion 78, an inner end portion 80 and an outer end portion 82. The junction between bottom portion 78 and outer end portion 82 is curved and is parallel to and confronts the junction between bottom portion 24 and inner end portion 22 of perimeter frame 16 of first barrier section 12. Pet door 68 includes three vertical support members 84 running from bottom portion 78 to top portion 76. Vertical support members 84 are vertically aligned with vertical support members 72. Pet door 68 is swingable on a vertical axis that is slightly offset from vertically disposed inner end portion 80. The axis is defined by pivot pins 86, one of which runs between top portion 76 and horizontal member 70 and one of which runs between bottom portion 78 and bottom portion 24. Pet door 68 includes a stop 88 that is affixed to a face of bottom portion 78 and extends downwardly therefrom such that a distal end of stop 88 terminates below the upper edge of bottom portion 24 such that stop 88 makes contact with bottom portion 24. Pet door 68 thus preferably swings to only one side of barrier 10. However, if desired, stop 88 can be removed such that pet door 68 can swing through barrier section 12 and thus swing through barrier section 12 and out to either side of barrier 10. When stop 88 is making contact with bottom portion 24, pet door 68 is in generally the same plane as barrier section 12.

With pet door 68 in the lower and outer corner of the barrier section 12, a pet such as a dog can pass through barrier 10 even when the barrier 10 is in the contracted position shown in FIG. 1B. That is, as shown by guide 37, the second barrier section 14 slides in the longitudinal direction to close off a portion of the opening left by an open pet door 68. However, a portion of the opening left by an open pet door 68 remains open even if second barrier section 14 is slid as far as possible in the direction of end portion 22.

First barrier section 12 includes a region or opening 90 that is bounded by top portion 18, inner end portion 20, horizontal support member 58 and outer end portion 22. Region 90 is free of vertical running supports. Region 90 is free of horizontal running supports. Region 90 is an opening or window that is free of any type of protrusion therein. Immediately below region 90 is the first elongate panel 54 with the panel 54 having its frame defined by horizontal members 58 and 60 and vertical members 62 and 64. The combination of the free region 90 and the elongate panel 54 minimizes the chance that fingers or hands can be pinched between sliding barrier sections 12, 14. The combination of the free region 90 and the top portion 18 permits a hand to grasp and slide barrier section 12 with only the inner end portion 30 to pay attention to as the barrier sections 12, 14 slide relative to one another.

First elongate panel 54 of barrier 12 includes a metal frame defined by horizontal support member 58, horizontal support member 60, vertical support member 64 and vertical support member 66. If desired, vertical member 64 may be one-piece with inner end portion 20 and vertical member 62 may be one-piece with outer end portion 22.

Second barrier section 14 includes features that are identical to first barrier section 12. These common features include a) a second barrier section 14 that includes perimeter frame 26 formed by top portion 28, inner end portion 30, outer end portion 32 and bottom portion 34, b) a second barrier section 14 that includes the elongate panel 54, referred to as a second elongate panel, c) a second barrier section 14 that includes horizontal support member 58, horizontal support member 60, outer end vertical support member 62 and inner end vertical member support member 64, d) a second barrier section 14 that includes, as with first elongate panel 54 of barrier section 12, members 58, 60, 62 and 64 that form a frame for the second elongate panel 54, e) a second barrier section 14 that includes the free region 90 formed by top portion 26, end portion 32, end portion 30, and horizontal support member 58 (or elongate panel frame portion 58), and f) a second barrier section 14 that includes the rigidly affixed guides 37 (whereas first barrier section 12 includes the rigidly affixed guides 36).

Second barrier section 14 further includes a set of eight vertical support members 92 running from bottom portion 34 to horizontal support member 60. Members 92 are disposed between inner end portion 30 and outer end portion 32. Members 92 are equidistantly spaced from each other.

Second barrier section 14 preferably does not include a pet door, such as pet door 68.

When the barrier sections 12, 14 are slid away from each other, the guides 36, 37 in combination work as a stop to prevent further expansion. As the outer end portions 22 and 32 reach a maximum distance apart, the inner edges of top guides 36, 37 will hit each other and the inner edges of bottom guides 36, 37 will hit each other to prevent the barrier sections 12, 14 from sliding further apart.

When the barrier sections 12, 14 are slid toward each other, the inner end of tube 40 will push slide 44 toward outer end portion 32 on inner tube 42 when the drop pin 50 is disengaged. When the outer end of slide 44 hits end portion 32, the outer end portions 22 and 32 cannot slide any further together such that such is the limitation of contraction for the barrier 10.

The elongate panels 54 of barrier sections 12, 14 have the same height, width and length.

As shown in FIGS. 1A and 1B, the first and second elongate panels 54 are aligned with each other such that, when the first and second barrier sections 12, 14 slide relative to one another, at least a portion of one elongate panel 54 is hidden from view behind the other elongate panel 54 and such that at least a portion of one elongate panel 54 comes face to face with another portion of the other elongate panel 54.

FIGS. 1A and 1B show 1) a residential barrier that includes: a) a first barrier section disposed in generally a first plane; b) a second barrier section disposed in generally a second plane, with the first and second barrier sections engaged to each other and slideable relative to each other in said first and second planes respectively, with the first and second planes being parallel to each other; c) with the first barrier section including a first perimeter frame, with the first perimeter frame including a first top portion, a first inner end portion, a first outer end portion, and a first bottom portion; d) with the second barrier section including a second perimeter frame, with the second perimeter frame including a second top portion, a second inner end portion, a second outer end portion, and a second bottom portion; e) with the first barrier section including a first elongate panel comprising wood that confronts and is spaced apart from the first top portion of the first perimeter frame; f) with the second barrier section including a second elongate panel comprising wood that confronts and is spaced apart from the second top portion of the second perimeter frame; g) a plurality of first inner support members in a first region bounded by the first elongate panel, the first bottom portion, and the first inner and outer end portions; h) a plurality of second inner support members in a second region bounded by the second elongate panel, the second bottom portion, and the second inner and outer end portions; i) with the first and second elongate panels being aligned with each other such that, when the first and second barrier sections slide relative to one another, at least a portion of one elongate panel is hidden from view behind the other elongate panel, and such that at least a portion of one elongate panel comes face to face with another portion of the other elongate panel.

FIGS. 1A and 1B further show that 2) the first and second elongate panels have the same height, width, and length; 3)

the first barrier section includes first and second horizontal support members that are spaced apart from each other, that are parallel to each other, and that run from the first inner end portion to the first outer end portion of the first barrier section, with the first elongate panel being engaged between said first and second horizontal support members of the first barrier section; and wherein the second barrier section includes first and second horizontal support members that are spaced apart from each other, that are parallel to each other, and that run from the second inner end portion to the second outer end portion of the second barrier section, with the second elongate panel being engaged between said first and second horizontal support members of the second barrier section; 4) the first elongate panel includes a first metal frame, with the first metal frame engaging the first inner and outer end portions of the first perimeter frame; and the second elongate panel includes a second metal frame, with the second metal frame engaging the second inner and outer end portions of the second perimeter frame; and 5) the first barrier section includes a first opening between the first elongate panel and the first top portion of the first perimeter frame, with the opening being defined by a) one of the first elongate panel and a frame of the first elongate panel; b) the first top portion of the first perimeter frame; c) each of the first inner and outer end portions of the first perimeter frame; and d) no vertical support members; and the second barrier section includes a second opening between the second elongate panel and the second top portion of the second perimeter frame, with the second opening being defined by a) one of the second elongate panel and a frame of the second elongate panel; b) the second top portion of the second perimeter frame; c) each of the second inner and outer end portions of the second perimeter frame; and d) no vertical support members, such that the first and second barrier sections may be slid relative to each other with minimal pinching of the fingers when a user grasps with his or her hand the first and second top portions of the first and second perimeter frames.

Figure 2A:
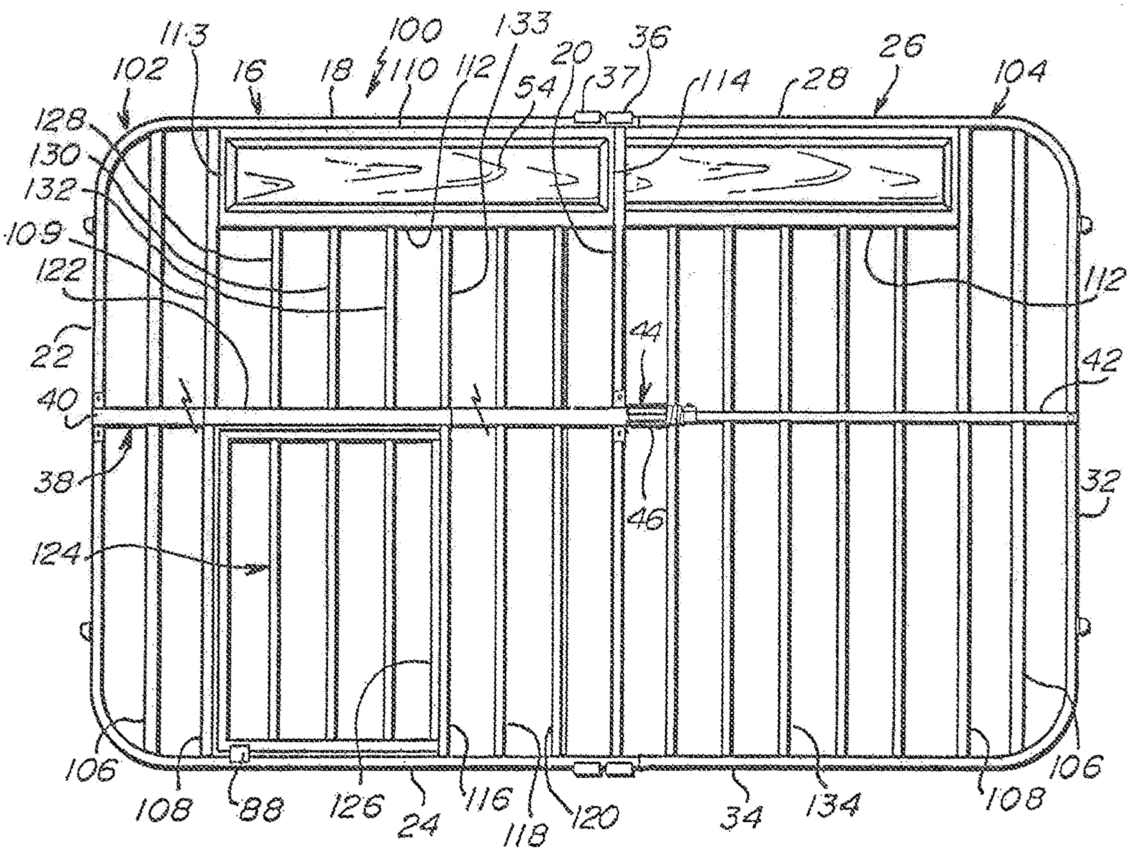
FIG. 2A is a front view of one embodiment of the present barrier in an expanded configuration.
Figure 2B:
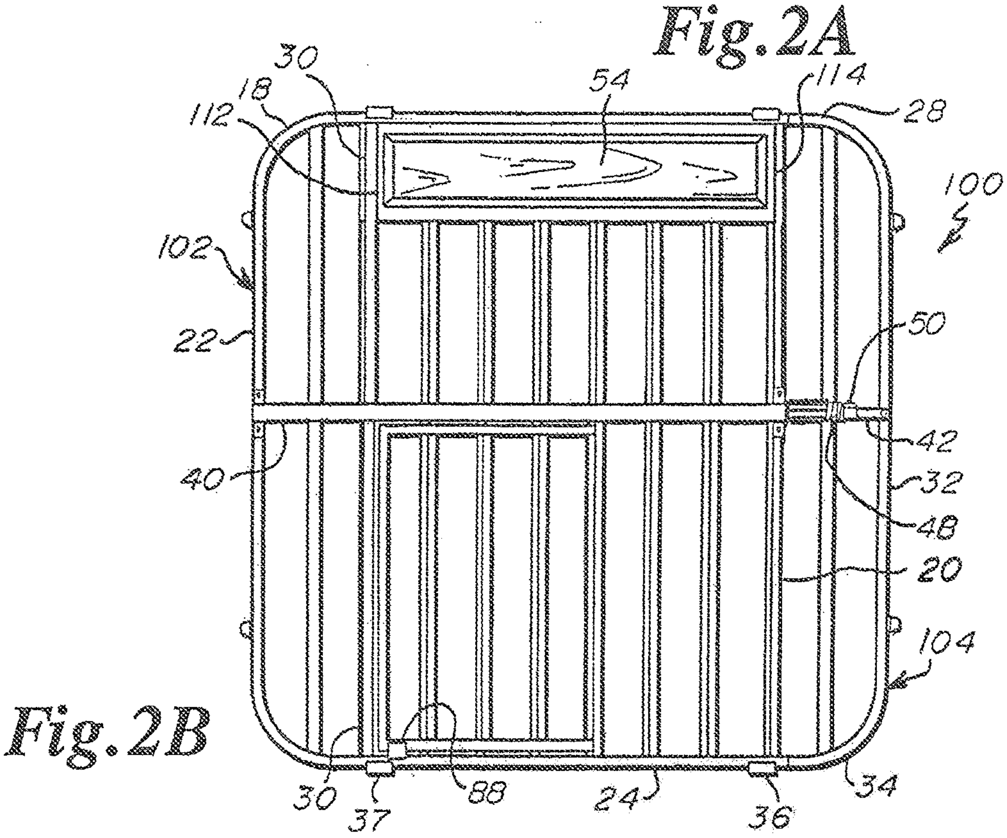
FIG. 2B is a front view of the barrier of FIG. 2A in a retracted configuration.

Barrier 100 is shown in FIGS. 2A and 2B. Barrier 100 includes a first barrier section 102 and a second barrier section 104.

Barrier 100 includes features that are identical to barrier 10. These common features include: a) in first barrier section 102, a first perimeter frame 16 and its top portion 18, inner end portion 20, outer end portion 22 and bottom portion 24, b) in second barrier section 104, a second perimeter frame 26 and its top portion 28, inner end portion 30, outer end portion 32, and bottom portion 34, c) in barrier section 102, a first elongate panel 54, except the length of panel 54 and except the position of panel 54 in barrier section 102, d) in barrier section 104, a second elongate panel 54, except the length of panel 54 and except the position of panel 54 in barrier section 104, e) mechanism 38, including outer tube 40, inner tube 42, slide 44, wheel 46, threads 48, and drop pin 50, f) guides 36, 37, and g) bumpers 52.

Barrier section 102 includes a vertical support member 106 that runs from bottom portion 24 to top portion 18. This is the only vertical support member in the perimeter frame 16 that runs the entire height of the barrier section 102.

Barrier section 102 includes a vertical support member 108 that runs to and between bottom portion 24 and a horizontal support member 122. A vertical support member 109 runs from horizontal support member 122 to top portion 18. Vertical support members 108, 109 are vertically aligned with each other.

Barrier section 102 includes horizontal support members 110, 112 that run to and between vertical support member 109 and inner end portion 20. A pair of vertical support members 113, 114 run to and between horizontal support members 110, 112. Members 110, 112, 113, and 114 provide a frame for elongate panel 54. Members 110, 112 terminate prior to the outer end portion 22, with vertical support members 106 and 109 being disposed between the distal ends of members 110, 112 and outer end portion 22.

Barrier section 102 includes a set of two vertical support members 118, 120 that run from bottom portion 24 to horizontal member 112. Vertical support member 116 runs from bottom portion 24 to horizontal member 122. Then a separate vertical support member 133 runs from horizontal member 122 to horizontal member 112.

Barrier section 102 includes horizontal member 122 that runs to and between vertical support member 108 and vertical support member 116. Horizontal member 122 is at the same height as outer tube 40.

Barrier section 102 includes a pet door 124. Pet door 124 includes a rectangular frame. Within the rectangular frame, pet door 124 includes a set of three vertical support members. Pet door 124 is set within a frame made up of sections of bottom portion 24, vertical support member 108, horizontal support member 122, and vertical support member 116. Pet door 124 includes stop 88, like pet door 68, such that pet door 124 swings out of only one side of the barrier section 102 to prevent the pet door 124 from swinging into barrier section 104. End vertical support 126 provides a vertical axis about which pet door 124 swings and pivot pins, also on such vertical axis, run from bottom portion 24 to the lower horizontal support member of the pet door 124 and further run from horizontal portion 122 to the upper horizontal support member of pet door 124.

Horizontal support member 122, located above pet door 124 and running to and between vertical support members 108 and 116, provides a base for four vertical support members 128, 130, 132, and 133 that run to and between horizontal support member 122 and horizontal support member 112. Horizontal support member 122 also provides a base for vertical support member 109 that runs to top portion 18.

Elongate panel 54 confronts top portion 18. The upper portion of the frame of elongate panel 54, i.e., horizontal support member 110, is immediately adjacent to, and may abut and may engage, top portion 18. With the elongate panel 54 confronting the top portion 18, chances are minimized that fingers or hands will be pinched when the barrier sections 102, 104 slide relative to one another.

Elongate panel 54 confronts inner end portion 20. Vertical support member 114 is immediately adjacent to, and may abut and may engage, inner end portion 20. With the elongate panel 54 confronting the end portion 20, chances are minimized that fingers or hands will be pinched when the barrier sections 102, 104 slide relative to one another.

Elongate panel 54 is spaced from outer end portion 22. Vertical support members 106 and 109 are disposed between elongate panel 54 and outer end portion 22.

Barrier section 104 is identical to barrier section 102 except that barrier section 104 does not have pet door 124 and also does not have the attendant horizontal support portion 122 and three vertical support members 128, 130.

Barrier section 104 includes a set of vertical support members 134 running to and between bottom portion 34 and horizontal member 112. Barrier section 104 includes vertical support member 106 that runs from bottom portion 34 to top portion 28. Sections of vertical support members 106 and 109 are disposed between elongate panel 54 of barrier section 104 and outer end portion 32.

Like barrier 10, at least a portion of one of the elongate panels 54 of barrier 100 is hidden from view behind the other elongate panel 54 such that at least a portion of one elongate panel 54 comes face to face with another portion of the other elongate panel 54.

The elongate panels 54 of barrier sections 102, 104 have the same height, width and length.

As noted in FIG. 2B, barrier section 102 may be positioned relative to barrier section 104 such that the elongate panels 54 of barrier section 102, 104 are positioned directly in front, or behind, of each other such that, when viewing the barrier 100 from the face of barrier 102 or the face of barrier 104, it appears that there is only one elongate barrier 54. In other words, the elongate panels 54 of barrier 100 can, at one position, be aligned in the lateral direction.

In barrier section 102, it should be noted that vertical member 113 and vertical member 109 may be one-piece and/or vertical member 114 may be one-piece with inner end portion 20 and/or horizontal member 110 may be one-piece with top portion 18. The same is true with respect the same features in barrier section 104.

In barrier section 102, horizontal members 110, 112 are parallel to each other, are spaced apart from each other, and run outwardly from the first inner end portion 20 toward the outer end portion 22 and terminate prior to the first outer end portion 22. The first elongate panel 54 is engaged between members 110, 112. The same is true with respect to barrier section 104.

Members 110, 112, 113, and 114 make up a metal frame for the first elongate panel in barrier section 102. Member 114 engages the inner end portion 20 of the perimeter frame 16. Member 110 engages the top portion 18 of the perimeter frame 16. The same is true with respect to barrier section 102.

FIGS. 2A and 2B show 1) a residential barrier that includes a) a first barrier section disposed in generally a first plane; b) a second barrier section disposed in generally a second plane, with the first and second barrier sections engaged to each other and slideable relative to each other in said first and second planes respectively, with the first and second planes being parallel to each other; c) with the first barrier section including a first perimeter frame, with the first perimeter frame including a first top portion, a first inner end portion, a first outer end portion, and a first bottom portion; d) with the second barrier section including a second perimeter frame, with the second perimeter frame including a second top portion, a second inner end portion, a second outer end portion, and a second bottom portion; e) with the first barrier section including a first elongate panel comprising wood that confronts the first top portion of the first perimeter frame; f) with the second barrier section including a second elongate panel comprising wood that confronts the second top portion of the second perimeter frame; g) with the first barrier section including at least one inner support member extending to and between the first top portion and the first bottom portion of the first perimeter frame and further including at least one inner support member extending to and between the first elongate panel and the first bottom portion of the first perimeter frame; h) with the second barrier section including at least one inner support member extending to and between the second top portion and the second bottom portion of the second perimeter frame and further including at least one inner support member extending to and between the second elongate panel and the second bottom portion of the second perimeter frame; i) with the first and second elongate panels being aligned with each other such that, when the first and second barrier sections slide relative to one another, at least a portion of one elongate panel is hidden from view behind the other elongate panel, and such that at least a portion of one elongate panel comes face to face with another portion of the other elongate panel.

FIGS. 2A and 2B further show that 2) the first and second elongate panels have the same height, width, and length; 3) the first barrier section includes first and second horizontal support members that are spaced apart from each other, that are parallel to each other, that run outwardly from the first inner end portion toward the outer end portion of the first barrier section, and that terminate prior to the first outer end portion of the first barrier section, with the first elongate panel being engaged between said first and second horizontal support members of the first barrier section; and the second barrier section includes first and second horizontal support members that are spaced apart from each other, that are parallel to each other, that run outwardly from the second inner end portion toward the second outer end portion of the second barrier section, and that terminate prior to the second outer end portion of the second barrier section, with the second elongate panel being engaged between said first and second horizontal support members of the second barrier section; 3) the first elongate panel includes a first metal frame, with the first metal frame engaging the first inner end portion of the first perimeter frame; and the second elongate panel includes a second metal frame, with the second metal frame engaging the second inner end portion of the second perimeter frame; and 4) the first metal frame engages the top portion of the first perimeter frame and the second metal frame engages the top portion of the second perimeter frame.

Figure 3A:
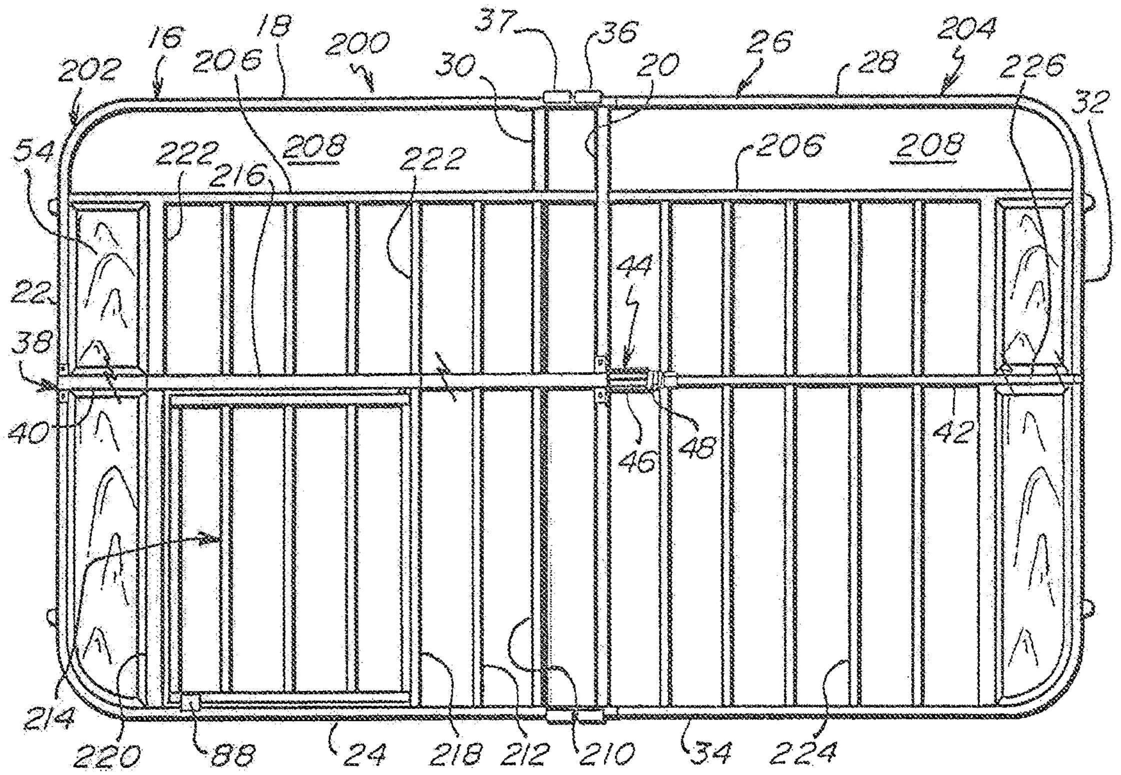
FIG. 3A is a front view of one embodiment of the present barrier in an expanded configuration.
Figure 3B:
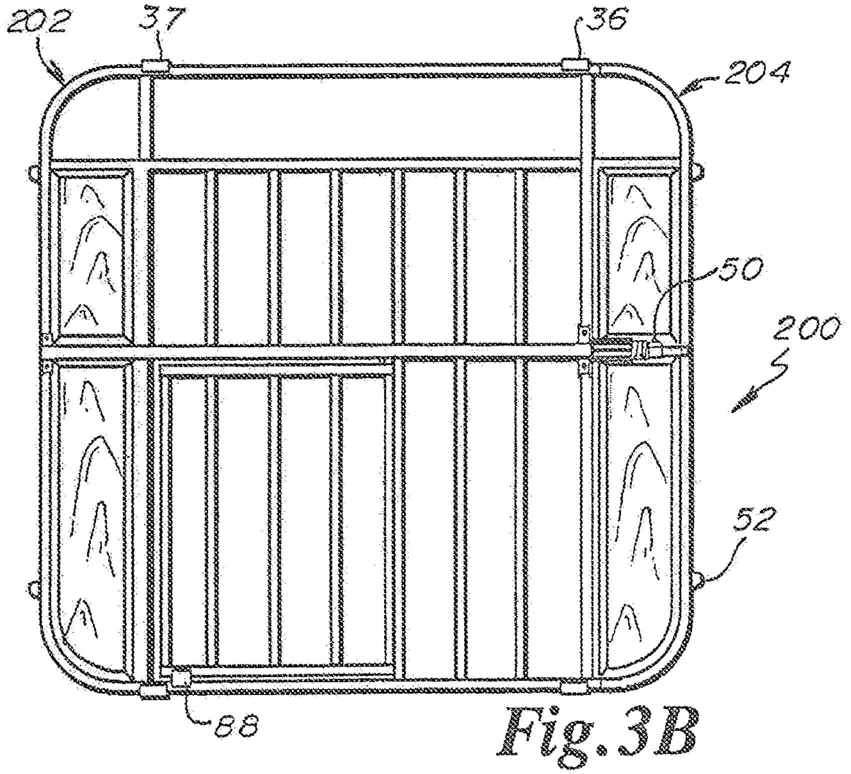
FIG. 3B is a front view of the barrier of FIG. 3A in a retracted configuration.

Barrier 200 is shown in FIGS. 3A and 3B. Barrier 200 includes a first barrier section 202 and a second barrier section 204.

Barrier 200 includes features that are identical to barrier 10. These common features include: a) in first barrier section 202, a first perimeter frame 16 and its top portion 18, inner end portion 20, outer end portion 22 and bottom portion 24, b) in second barrier section 204, a second perimeter frame 26 and its top portion 28, inner end portion 30, outer end portion 32, and bottom portion 34, c) in barrier section 202, a pair of first elongate panels 54, except the length of panel 54, except the position of panel 54 in barrier section 102 and except the number of first elongate panels 54, d) in barrier section 204, a pair of second elongate panels 54, except the length of panel 54, except the position of panel 54 in barrier section 104, and except the number of elongate panels 54, e) mechanism 38, including outer tube 40, inner tube 42, slide 44, wheel 46, threads 48, and drop pin 50, f) guides 36, 37, and g) bumpers 52.

Barrier section 202 includes a horizontal support member 206 running from inner end portion 20 to outer end portion 22. Horizontal support member 206 is spaced from top portion 18. Horizontal support member 206, top portion 18, inner end portion 20 and outer end portion 22 define a free space or region or opening 208 with no vertical or horizontal running support members. The purpose of free space 208 is to minimize the chances of hands and fingers being clipped by vertical support members of one of the barrier sections 202, 204 as the barrier sections 202, 204 slide past each other.

Barrier section 202 further includes a pair of vertical support members 210, 212 running from bottom portion 24 to horizontal support member 206. Vertical support members 210, 212 are disposed between a pet door 214 and inner end portion 20.

Barrier section 202 further includes a horizontal support member 216 engaged to and running inwardly from outer end portion 22. The horizontal support member 216 runs immediately above the pet door 214. The horizontal support member 216 is supported by vertical support members 218, 220, both of which confront and run immediately adjacent to the pet door 214. The pet door 214 is further framed by the bottom portion 214.

Barrier section 202 further includes a set of five vertical support members 222 running to and between horizontal support member 216 and horizontal support member 206. An inwardly most member 222 confronts support member 212. An outwardly most member 222 confronts the upper elongate panel 54 of barrier section 202.

Barrier section 202 includes an upper elongate panel 54 that is framed by horizontal member 206, outwardly most vertical member 222, horizontal member 216 and outer end portion 22. This upper elongate panel 54 takes the shape of a rectangle.

Barrier section 202 includes a lower elongate panel 54 that is framed by lower portion 84, vertical support member 220, horizontal support member 216 and outer end portion 22. The lower elongate panel 54 tracks the shape of such a frame and includes the shape of the curved junction of lower portion 84 and outer end portion 22.

The upper and lower elongate panels 54 of barrier section 202 are vertically aligned with each other.

Barrier section 202 includes the pet door 214. Pet door 214 is framed by horizontal support member 216, vertical support members 220 and 218, and bottom portion 24. Pet door 214 includes five vertical support members and a pair of upper and lower horizontal support members. Pet door 214 includes stop 88 that makes contact with bottom portion 24 to prevent pet door 214 from swinging into barrier section 204. Pet door 214 thus swings out to one side only. The axis of pet door 214 is set by an upper pivot pin extending from horizontal member 216 to the upper horizontal member of the pet door 214 and by a lower pivot pin extending from bottom portion 24 to the lower horizontal support member of the pet door 214. The pivot pins can be aligned vertically with the vertical support member of the pet door 214 that confronts vertical support member 218.

Barrier section 204 is identical to barrier section 202 except that barrier section 204 does not include pet door 214 and does not include horizontal member 216. Instead of pet door 214, barrier section 204 includes a set of vertical members 224 running from bottom portion 34 to horizontal support member 206 of barrier section 204. The vertical members 224 are disposed between inner end portion 30 and outer end portion 32. The outermost vertical member 224 confronts each of the upper and lower elongate panels 54 of barrier section 204. Instead of horizontal member 216, barrier section 204 includes a shorter horizontal support member 226 running between the outer end portion 32 and the outwardly most vertical support member 224. Horizontal support member 226 is disposed between upper elongate panel 54 and lower elongate panel 54 of barrier section 204.

The upper elongate panel 54 of barrier section 204 is framed by the outermost vertical support member 224, horizontal support member 206, inner end portion 32 and horizontal support member 226.

The lower elongate panel 54 of barrier section 204 is framed by the outermost vertical support member 224, horizontal support member 226, outer end portion 32, and bottom portion 34.

Like barrier section 202, barrier section 204 includes free space 208 having no vertical or horizontal support members to minimize the chances of fingers and hands being clipped by such support members when the barrier sections 202, 204 slide past one another.

Barrier 200 includes the elongate panels 54 at the end most side portions of the barrier 200. The provision of elongate panels here may provide a transition from paneled walls or wooden cabinets or wood furniture to the metal features of the barrier 200.

FIGS. 3A and 3B show 1) a residential barrier that includes a) a first barrier section disposed in generally a first plane; b) a second barrier section disposed in generally a second plane, with the first and second barrier sections engaged to each other and slideable relative to each other in said first and second planes respectively, with the first and second planes being parallel to each other; c) with the first barrier section including a first perimeter frame, with the first perimeter frame including a first top portion, a first inner end portion, a first outer end portion, and a first bottom portion; d) with the second barrier section including a second perimeter frame, with the second perimeter frame including a second top portion, a second inner end portion, a second outer end portion, and a second bottom portion; e) with the first barrier section including a first vertical elongate panel comprising wood that confronts the outer end portion of the first perimeter frame, with the first elongate panel extending vertically; f) with the second barrier section including a second vertical elongate panel that includes wood that confronts the outer end portion of the second perimeter frame, with the second elongate panel extending vertically; g) a first horizontal support member extending to and between the first inner end portion and the first outer end portion of the first perimeter frame; h) a second horizontal support member extending to and between the second inner end portion and the second outer end portion of the first perimeter frame; i) a plurality of first inner support members in a first region bounded by the first horizontal support member, the first bottom portion, the first vertical elongate panel, and the first inner end portion; h) a plurality of second inner support members in a second region bounded by the second horizontal support member, the second bottom portion, the second vertical elongate panel, and the second inner end portion; i) with the first and second vertical elongate panels being opposite of each other regardless of the positions of the first and second barrier sections that slide relative to one another.

FIGS. 3A and 3B further show that 2) the first and second elongate panels have the same height, width, and length; 3) the first barrier section includes a first vertical support member running between the first horizontal support member and the first bottom portion, with the first elongate panel being engaged between the first vertical support member and the first outer end portion; and wherein the second barrier section includes a second vertical support member running between the second horizontal support member and the second bottom portion, with the second elongate panel being engaged between the second vertical support member and the second outer end portion; 4) the first barrier section includes another vertical elongate panel vertically aligned with the first vertical elongate panel; and the second barrier section includes another vertical elongate panel vertically aligned with the second vertical elongate panel; 5) the first barrier section includes a first opening between the first top portion of the first perimeter, the first horizontal support member, the first inner end portion and the first outer end portion, with the first opening having no vertical support members; and wherein the second barrier section includes a second opening between the second top portion of the second perimeter, the second horizontal support member, the second inner end portion and the second outer end portion, with the second opening having no vertical support members such that the first and second barrier sections may be slid relative to each other with minimal pinching of the fingers when a user grasps with his or her hand the first and second top portions of the first and second perimeter frames.

Figure 4A:
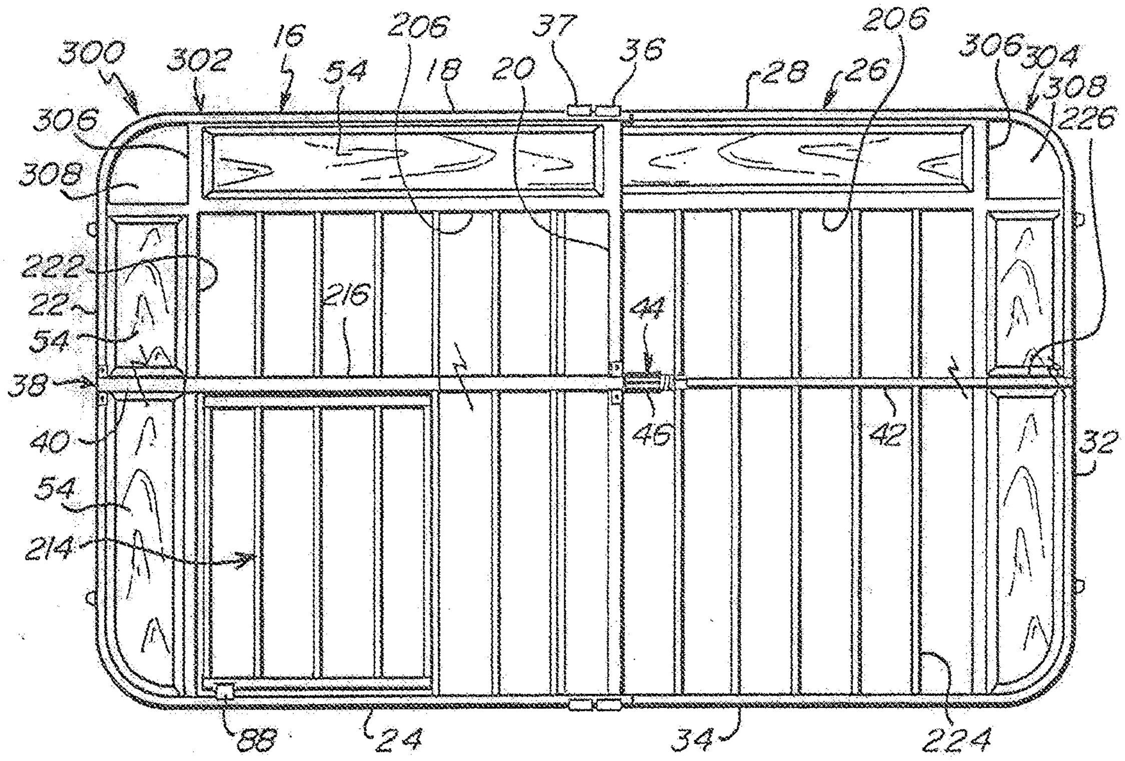
FIG. 4A is a front view of one embodiment of the present barrier in an expanded configuration.
Figure 4B:
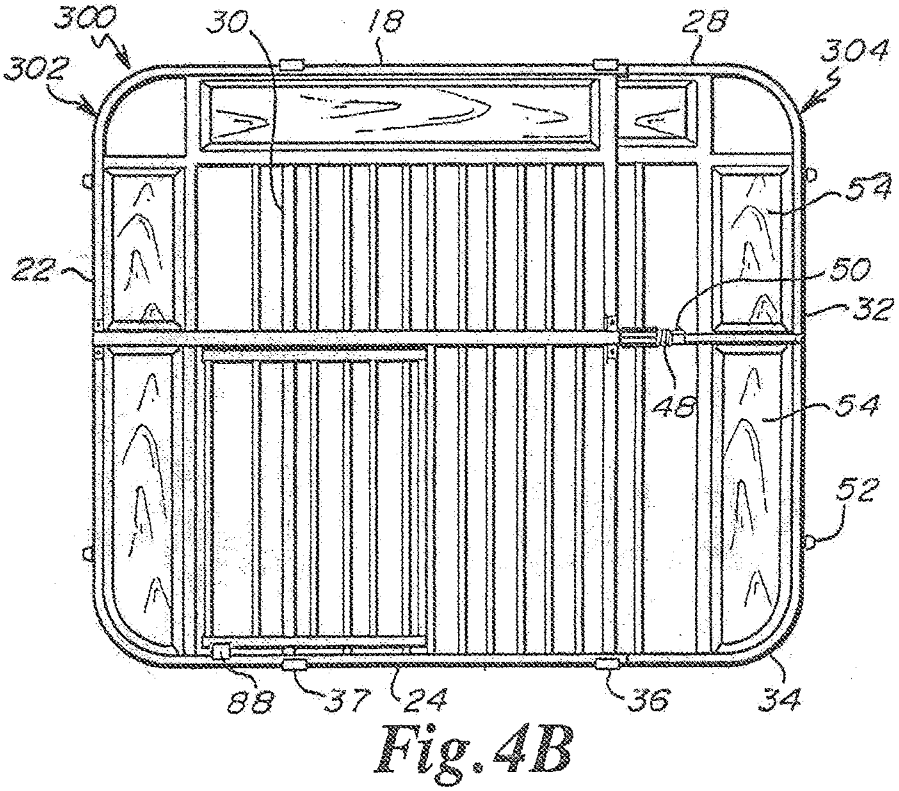
FIG. 4B is a front view of the barrier of FIG. 4A in a retracted configuration.

Barrier 300 is shown in FIGS. 4A and 4B. Barrier 300 includes a first barrier section 302 and a second barrier section 304.

Barrier 300 includes features that are identical to barrier 200. These common features include: a) in first barrier section 302, a first perimeter frame 16 and its top portion 18, inner end portion 20, outer end portion 22 and bottom portion 24, b) in second barrier section 304, a second perimeter frame 26 and its top portion 28, inner end portion 30, outer end portion 32, and bottom portion 34, c) in barrier section 302, an upper vertically extending elongate panel 54 confronting outer end portion 22, and a lower vertically extending elongate panel 54 confronting outer end portion 22, with the upper and lower vertically extending elongate panels 54 being aligned vertically, d) in barrier section 304, an upper vertically extending elongate panel 54 confronting outer end portion 32, and a lower vertically extending elongate panel 54 confronting outer end portion 32, with the upper and lower vertically extending elongate panels 54 being aligned vertically, e) mechanism 38, including outer tube 40, inner tube 42, slide 44, wheel 46, threads 48, and drop pin 50, f) guides 36, 37, g) bumpers 52, h) pet door 214, i) horizontal member 216, j) vertical support members 210, 212, k) vertical support members 222, l) stop 88, m) vertical support members 218, 220, n) in barrier section 304, horizontal support member 226, and o) in barrier section 304, vertical support members 224.

Barrier section 302 further includes a vertical support member 306 running from horizontal support member 206 to top portion 18. Vertical support member 306, horizontal support member 206, top portion 18, and inner end portion 20 frames horizontal elongate panel 54.

Barrier section 302 includes a corner free space 308 that is formed by top portion 18, outer end portion 22, horizontal support member 206, and vertical support member 306. The curved junction of top portion 18 and outer end portion 22 also define this corner free space 308.

Barrier section 304 includes the vertical support member 306 and the corner free space 308. In barrier section 304, the horizontally extending elongate panel 54 is framed by top portion 28, vertical support member 306, horizontal support member 206, and inner end portion 30. In barrier section 304, corner free space 308 is formed or framed by top portion 28, outer end portion 32, horizontal support member 206, and vertical support member 306.

Barrier 300 includes the horizontal elongate panels 54 that confront the top portions 18 and 28 of the perimeter frames 16 and 26 so as to minimize the chances of hands and fingers being clipped as the barrier sections 302, 304 slide by one another. Further, the corner free spaces 308 provide ready made handles, at the curved junction of top portion 18 and outer end portion 22 and at the curved junction of top portion 28 and outer end portion 32, for the user to hold. Still further, the presence of both horizontally extending and vertically extending elongate panels 54 provide a wooden frame, or a frame along three sides, to the barrier 300.

The first barrier section 302 includes a first vertical inner support member 222 running from the first bottom portion 24 to the horizontal support member 206 and that continues running via vertical support member 306 to the first top portion 18 of the first perimeter frame 16. This first vertical support member 222 and its upper component 306 engage each of the first vertical elongate panels 54 of barrier section 302 and further engage the first horizontal elongate panel 54. Vertical support member 222 and vertical support member 306 can be integral and one-piece. The second barrier section 304 also has vertical support member 222 and vertical support member 306 that engage each of the vertical elongate panels 54 of barrier section 302 and that further engage the horizontal elongate panel 54 of barrier section 304.

As to barrier 300 in FIGS. 4A and 4B, the first and second horizontal elongate panels 54 have the same height, width, and length, the first and second upper vertical elongate panels 54 have the same height, width, and length, and the first and second lower vertical elongate panels 54 have the same height, width, and length.

FIGS. 4A and 4B show 1) a residential barrier that includes a) a first barrier section disposed in generally a first plane; b) a second barrier section disposed in generally a second plane, with the first and second barrier sections engaged to each other and slideable relative to each other in said first and second planes respectively, with the first and second planes being parallel to each other; c) with the first barrier section including a first perimeter frame, with the first perimeter frame including a first top portion, a first inner end portion, a first outer end portion, and a first bottom portion; d) with the second barrier section including a second perimeter frame, with the second perimeter frame including a second top portion, a second inner end portion, a second outer end portion, and a second bottom portion; e) with the first barrier section including a first vertical elongate panel comprising wood that confronts the outer end portion of the first perimeter frame, with the first barrier section including a first horizontal elongate panel that includes wood that confronts the top portion of the first perimeter frame; f) with the second barrier section including a second vertical elongate panel that includes wood that confronts the outer end portion of the second perimeter frame, with the second barrier section including a second horizontal elongate panel that includes wood that confronts the top portion of the second perimeter frame; g) a first horizontal support member extending to and between the first inner end portion and the first outer end portion of the first perimeter frame, with the first horizontal elongate panel being disposed between the first horizontal support member and the first top portion of the first perimeter frame; h) a second horizontal support member extending to and between the second inner end portion and the second outer end portion of the second perimeter frame, with the second horizontal elongate panel being disposed between the second horizontal support member and the second top portion of the second perimeter frame; i) a plurality of first inner support members in a first region bounded by the first horizontal support member, the first bottom portion, the first vertical elongate panel, and the first inner end portion; j) a plurality of second inner support members in a second region bounded by the second horizontal support member, the second bottom portion, the second vertical elongate panel, and the second inner end portion; k) with the first and second horizontal elongate panels being aligned with each other such that, when the first and second barrier sections slide relative to one another, at least a portion of one horizontal elongate panel is hidden from view behind the other horizontal elongate panel, and such that at least a portion of one horizontal elongate panel comes face to face with another portion of the other horizontal elongate panel;

and l) with the first and second vertical elongate panels being opposite of each other regardless of the positions of the first and second barrier sections that slide relative to one another.

FIGS. 4A and 4B further show that 2) the first and second horizontal elongate panels have the same height, width, and length, wherein the first and second upper vertical elongate panels have the same height, width, and length, and the first and second lower vertical elongate panels have the same height, width, and length; 3) the first barrier section includes a first vertical inner support member running from the first bottom portion to the first top portion of the first perimeter frame, with the first vertical support member engaging each of the first vertical elongate panel and the first horizontal elongate panel; and the second barrier section includes a second vertical inner support member running from the second bottom portion to the second top portion of the second perimeter frame, with the second vertical support member engaging each of the second vertical elongate panel and the second horizontal elongate panel; 4) the first barrier section includes another vertical elongate panel vertically aligned with the first vertical elongate panel; and the second barrier section includes another vertical elongate panel vertically aligned with the second vertical elongate panel.

Figure 5A:
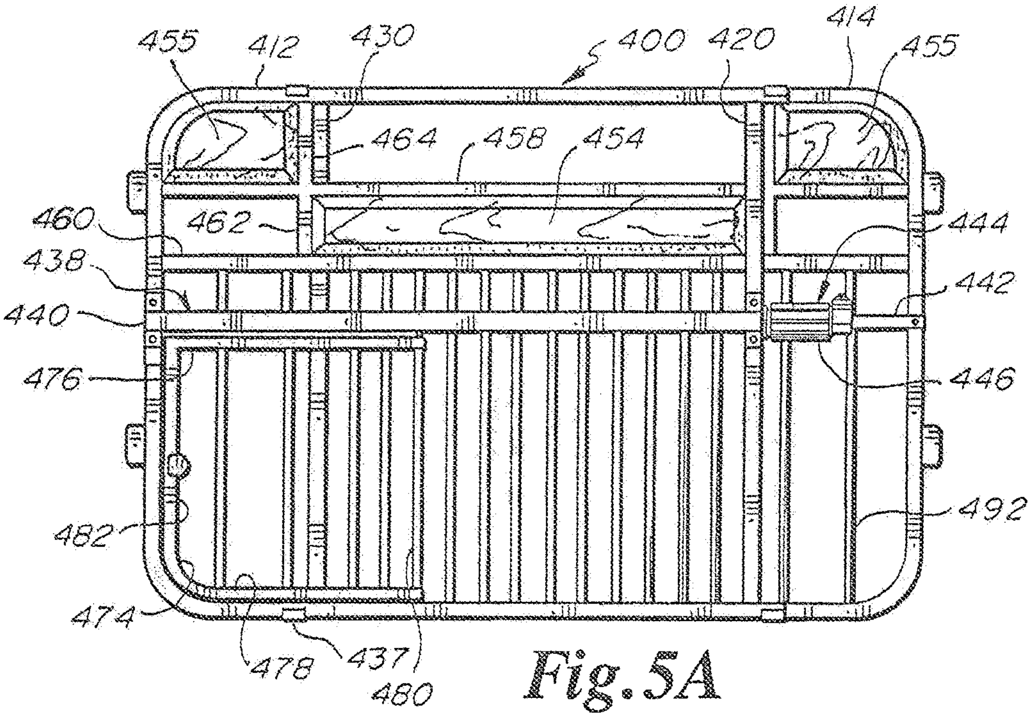
FIG. 5A is a front view of one embodiment of the present barrier in a retracted configuration.
Figure 5B:
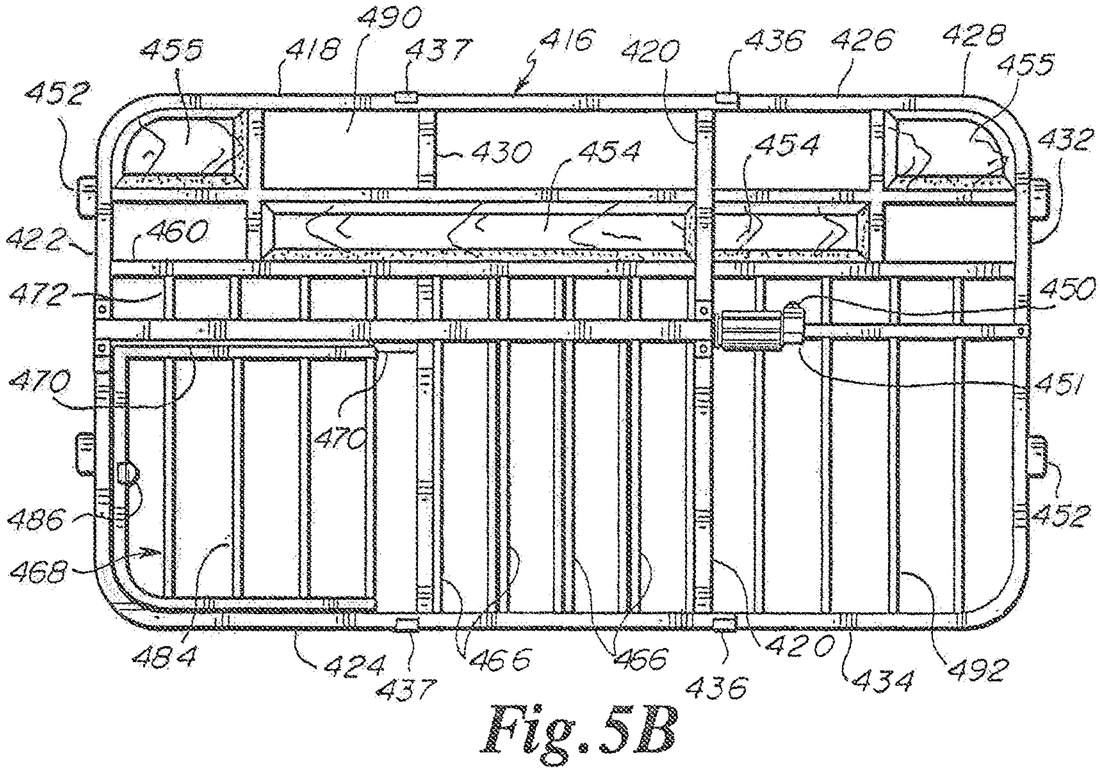
FIG. 5B is a front view of the barrier of FIG. 5A in an expanded configuration.
Figure 6:
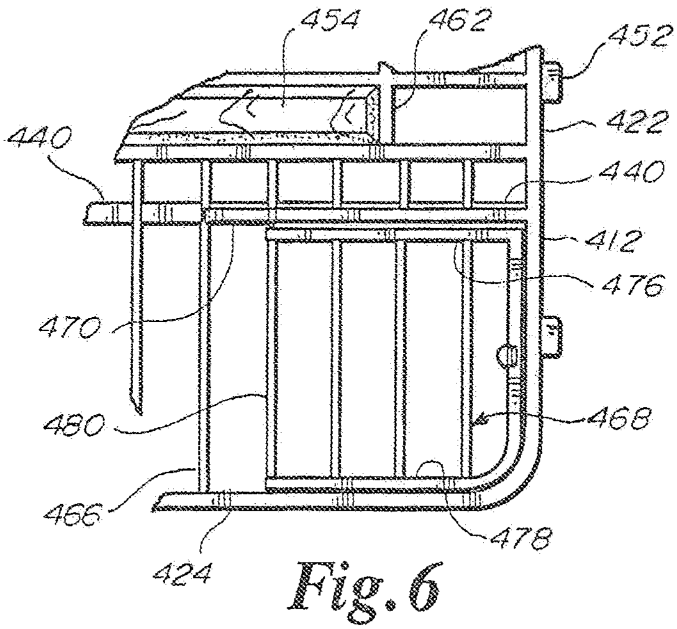
FIG. 6 is a rear detail view of a portion of the barrier of FIGS. 5A and 5B.

As shown in FIGS. 5A, 5B and 6, a barrier 400 includes a first barrier section 412 and a second barrier section 414. Barrier section 12 includes a first perimeter frame 416 that includes a top portion 418, a first inner end portion 420, a first outer end portion 422, and a first bottom portion 424. Barrier section 414 includes a second perimeter frame 426 that includes a top portion 428, a second inner end portion 430, a second outer end portion 432, and a second bottom portion 434.

A curved junction is provided between first top portion 418 and first outer end portion 422. A curved junction is provided between first bottom portion 424 and first outer end portion 422. A right angle junction is provided between first top portion 418 and first inner end portion 420. A right angle junction is provided between first bottom portion 424 and first inner end portion 420. A curved junction is provided between second top portion 428 and second outer end portion 432. A curved junction is provided between second bottom portion 434 and second outer end portion 432. A right angle junction is provided between second top portion 428 and second inner end portion 430. A right angle junction is provided between second bottom portion 434 and second inner end portion 430. The perimeter frames 416, 426 are identical to the first and second perimeter frames of the barriers of FIGS. 1A, 1B, 2A, 2B, 3A, 3B, 4A and 4B.

First barrier section 412 is disposed in generally a first plane. Second barrier section 414 is disposed in generally a second plane. The first and second barrier sections 412, 414 are engaged to each other and slideable relative to each other by a set of four guides or connections 436, 37. Guides 436 are rigidly affixed to the first barrier section 412 and slideably retain second barrier section 414. Guides 437 are rigidly affixed to the second barrier section 414 and slideably retain first barrier section 412. Each of the guides 436, 437 extends between the top portions 418, 428 or the bottom portions 424, 434. As to a guide 436 or 437 that extends between the top portions 418, 428, such guide 436 or 437 is rigidly fixed to one of the top portions 418, 428 and slideably retains therein the other of the top portions 418, 428. As to a guide 436 or 437 that extends between the bottom portions 424, 434, such guide 436 or 437 is rigidly fixed to one of the bottom portions 424, 434 and slideably retains therein the other of the bottom portions 424, 434. As to the guides 436 and 437, 1) the Flannery et al. U.S. Patent Application Publication No. 2010/0083577 A1 published Apr. 8, 2010 and entitled Quickly Slideable And Incrementally Adjustable Barrier and 2) the Flannery et al. U.S. Pat. No. 8,261,490 issued Sep. 11, 2012 and entitled Quickly Slideable and Incrementally Adjustable Barrier are hereby incorporated by reference in their entireties into this application. Via the guides 436 and 437, the first and second barrier sections 412, 414 slide in their respective planes, with the respective planes being parallel to each other. Guides 436 and 437 are identical to guides 36 and 37 of barriers of FIGS. 1A, 1B, 2A, 2B, 3A, 3B, 4A and 4B.

A longitudinal direction herein is defined by the direction in which the barrier sections 412, 414 slide. Inner end portion 420 and outer end portion 422 are set apart in the longitudinal direction. A lateral direction herein is defined by a direction into and out of the face of barrier section 412 or the face of barrier section 414. Guides 436, 437 extend from barrier section 412 to barrier section 414 in the lateral direction. A height direction is defined herein by the direction in which inner end portion 420 runs. Top portion 418 and bottom portion 424 are set apart from each other in the height direction. These definitions of longitudinal, lateral, and height directions apply to each of the barriers of FIGS. 1A, 1B, 2A, 2B, 3A, 3B, 4A, 4B, 5A, 5B, and 6.

As shown in FIGS. 5A, 5B and 6, barrier 400 includes a mechanism 438 that fixes and releases the barrier sections 412, 414 to and from each other in the longitudinal direction. Mechanism 438 includes an outer tube 440 that is engaged to and between first inner end portion 420 and first outer end portion 422 and an inner tube 442 that is fixed to second outer end portion 432 and that includes an inner free end that extends into outer tube 440. Outer tube 440 is set outwardly in the lateral direction of the support members of barrier section 412 so as to be spaced apart from such support members in the lateral direction. Inner tube 442 is set outwardly in the lateral direction of the support members of barrier section 414 so as to be spaced apart from such support members in the lateral direction. Inner tube 442 includes an upper face having a plurality of spaced apart holes. The mechanism 438 further includes a slide 444 that slides in the longitudinal direction on inner tube 442. Slide 444 includes a wheel 446, threads (such as threads 48 of barrier 10) on which the wheel 446 turns, and a drop pin 450 that engages the holes in the upper face of inner tube 442. Drop pin 450 is rigidly fixed to an inverted U-shaped plastic piece 451 such that the pin 450 and the U-shaped plastic piece 451 as a whole is raised and lowered relative to the slide 444 and inner tube 442. In operation, drop pin 450 is raised out of one of the holes of the inner tube 442, and then the barrier sections 412, 414 are slid relative to one another. Then, when the desired width of the barrier 10 as a whole is attained (i.e., the distance between outer end portions 422 and 432), the slide 444 (including wheel 446, the threads of wheel 446, drop pin 450 and the inverted U-shaped piece 451) is slid longitudinally on inner tube 442 to be adjacent to inner end portion 420 of first barrier section 412. Then the drop pin 450 is permitted to drop into a hole in the upper face of inner tube 442. To this point, the longitudinal adjustment of barrier 410 can be referred to as a macro adjustment. Then, after such macro adjustment, a fine adjustment commences. This fine adjustment includes turning wheel 446 on the threads of wheel 446 until an inner face of wheel 446, or plastic washer piece 449 slideable on inner tube 442, makes contact with a structure on first barrier section 412 such as an inner face of outer tube 440. Further turning of wheel 446 incrementally draws the barrier sections 412, 414 apart so as to incrementally place further pressure on opposing vertically extending surfaces, such as door jambs, that are engaging bumpers 452 on the outer end portions 422, 432. To release the barrier 400 from between the door jambs, the wheel 446 is turned in the opposite direction and/or the drop pin 450 can be taken out of the hole in which the pin 450 is engaged in the upper surface of inner tube 442. As to mechanism 438, 1) the Flannery et al. U.S. Patent Application Publication No. 2010/0083577 A1 published Apr. 8, 2010 and entitled Quickly Slideable And Incrementally Adjustable Barrier and 2) the Flannery et al. U.S. Pat. No. 8,261,490 issued Sep. 11, 2012 and entitled Quickly Slideable and Incrementally Adjustable Barrier are hereby incorporated by reference in their entireties into this application. Mechanism 438 is identical to mechanism 38 of the barriers of FIGS. 1A, 1B, 2A, 2B, 3A, 3B, 4A and 4B.

As shown in FIGS. 5A and 5B, barrier section 412 includes first and second elongate panels 454, 455. First and second elongate panels 454, 455 are wood, a wood product, a wood synthetic material, artificial wood, or a composite wood product such that the exterior of the panels 454, 455 has the look and feel of natural wood. Barrier section 414 also includes elongate panels 454, 455. Each of the barrier sections of FIGS. 1A, 1B, 2A, 2B, 3A, 3B, 4A, 4B, 5A, 5B and 6 have at least one elongate panel that is wood, a wood product, a wood synthetic material, artificial wood, or a composite wood product such that the exterior of the elongate panel has the look and feel of natural wood.

Elongate panels 454, 455 protrude outwardly in the lateral direction towards (and if desired beyond) a face of the first side of barrier section 412, where the face is defined by a plane lying on the first sides of top portion 418, inner end portion 420, outer end portion 422, and bottom portion 424. The first side of barrier section 412 is shown in FIGS. 5A and 5B. A second side of barrier section 412 is opposite the first side and elongate panels 454, 455 also protrude outwardly in the lateral direction towards (or if desired beyond) a face of the second side of the barrier section 412, where the face is defined by a plane lying on the second sides of top portion 418, inner end portion 420, outer end portion 422 and bottom portion 424. As the elongate panels 454, 455 protrude outwardly in the lateral direction, each of the elongate panels 454, 455 tapers toward a center of its respective elongate panel 454, 455. In other words, the upper edge of panel 454 tapers downwardly and in an outward lateral direction, the inner edge of panel 454 tapers outwardly and in an outward lateral direction, the outer edge of panel 454 tapers inwardly and in an outward lateral direction, and the bottom edge of panel 454 tapers upwardly and in an outward lateral direction. Likewise, the upper edge of panel 455 tapers downwardly and in an outward lateral direction, the inner edge of panel 455 tapers outwardly and in an outward lateral direction, the outer edge of panel 455 tapers inwardly and in an outward lateral direction, and the bottom edge of panel 455 tapers upwardly and in an outward lateral direction. The upper and outer edge of panel 455 share a curved junction with tapers that transition into each other. Each of panels 454, 455 includes front and rear faces. Each of the front and rear faces is flat. The front face of each of panels 454, 455 lies generally in a plane defined by the front faces of perimeter frame 416. The rear face of each of panels 454, 455 lies generally in a plane defined by the rear faces of perimeter frame 416. The front face of each of panels 454, 455 lies between and intersects with the tapering upper, lower, outer and inner edges. The rear face of each of panels 454, 455 lies between and intersects with the tapering upper, lower, outer and inner edges. Each of the elongate panels of the barrier sections of FIGS. 1A, 1B, 2A, 2B, 3A, 3B, 4A, 4B, 5A, 5B has such tapering (or beveled) features and such front and rear faces.

First barrier section 412 includes a pair of horizontal support members 458, 460. Support members 458, 460 run from inner support member 420 to outer support member 422. Support members 458, 460 are interconnected by inner end portion 420, outer end portion 422, and a vertically extending support member 462 that runs from lower horizontal support member 460 to upper horizontally extending support member 458. Another vertical support member 464 is vertically aligned with support member 462 and runs from upper horizontally extending support member 458 to the top portion 418 of the perimeter frame 416. Wood panel 454 is engaged between horizontal support members 458 and 460 and between vertically running support member 462 and vertically running inner portion 420. Wood panel 455 is engaged between upper horizontal support member 458 and top portion 418 of perimeter frame 416 and vertical support member 464 and outer end portion 422 of perimeter frame 416. Second barrier section 414 also includes horizontal support members 458, 460 and vertical support members 462, 464.

First barrier section 12 further includes a set of four vertical support members 466 running from bottom portion 424 to lower horizontal support member 460. Vertical support members 466 are disposed between a pet door 468 and the inner end portion 420. Vertical support members 466 are spaced equidistantly from each other.

First barrier section 412 further includes a horizontal support member 470 running inwardly from the outer end portion 422 to the outermost vertical support member 466 that runs between bottom portion 424 and horizontal support member 460. Horizontal support member 470 is disposed between horizontal support member 460 and bottom portion 424. Horizontal support member 470 is disposed at generally the same height as outer tube 440 and is partially hidden behind tube 440 in FIGS. 5A and 5B. (In FIG. 1A, tube 40 is shown broken apart such that horizontal support member 70 can be shown.)

First barrier section 12 further includes a set of four vertical support members 472 running from horizontal support member 470 to the intermediate horizontal support member 460. Vertical support members 472 are disposed between the outermost vertical support member 466 and outer end portion 422. Vertical support members 472 are spaced equidistantly from each other.

Pet door 468 is engaged in an outer and lower corner of barrier section 412. Pet door 468 includes a perimeter frame 474 that includes a top portion 476, a bottom portion 478, an inner end portion 480 and an outer end portion 482. The junction between bottom portion 478 and outer end portion 482 is curved and is parallel to and confronts the junction between bottom portion 424 and inner end portion 422 of perimeter frame 416 of first barrier section 412.

Pet door 468 includes three vertical support members 484 running from bottom portion 478 to top portion 476. Vertical support members 484 are vertically aligned with vertical support members 472. Pet door 68 is swingable on a vertical axis that is coaxial with inner end portion 80. The axis is defined by pivot pins, one of which runs between top portion 476 and horizontal member 470 and one of which runs between bottom portion 478 and bottom portion 424.

Pet door 468 includes latch 486 that includes a latch handle and a pin extending through outer end portion 482 of pet door perimeter frame 474 and into outer end portion 422 of section perimeter frame 416. A coil spring mounted in outer end portion 482 biases the latch pin into a closed position, i.e., a position where the pin extends outwardly and into section perimeter frame 416. To open the pet door 468, the latch handle is pulled inwardly and out of section perimeter frame 416, whereupon the pet door 468 can be swung to either of the front face or rear face of the barrier 400. Since the latch 468 is biased to a closed position, the portion of the pin that protrudes outwardly from pet door perimeter frame 474 hits a face of the section perimeter frame 416 unless the pin is retracted. When not retracted, the pin thus acts as a stop to prevent the pet door 468 from swinging through the barrier 400 from face to face. When latch 486 engages barrier section perimeter frame 416, pet door 468 is in generally the same plane as barrier section 412.

With pet door 468 in the lower and outer corner of the barrier section 412, a pet such as a dog can pass through barrier 400 even when the barrier 400 is in the contracted position shown in FIG. 5A. That is, as shown by guide 437, the second barrier section 414 slides in the longitudinal direction to close off a portion of the opening left by an open pet door 468. However, a portion of the opening left by an open pet door 68 remains open (remains as a through passage) even if second barrier section 414 is slid as far as possible in the direction of end portion 422.

First barrier section 412 includes a region or opening 490 that is bounded by top portion 418, inner end portion 420, horizontal support member 458 and vertical support member 464. Region 490 is free of vertical running supports. Region 490 is free of horizontal running supports. Region 490 is an opening or window that is free of any type of protrusion therein.

Immediately below region 490 is the first elongate panel 454 with the panel 454 having its frame defined by horizontal members 458 and 460 and vertical members 462 and inner end portion 420. The combination of the free region 490 and the elongate panel 454 minimizes the chance that fingers or hands can be pinched between sliding barrier sections 412, 414. The combination of the free region 490 and the top portion 418 permits a hand to grasp and slide barrier section 412 with only the inner end portion 430 to pay attention to as the barrier sections 412, 414 slide relative to one another.

Second barrier section 414 includes features that are identical to first barrier section 12. These common features include a) a second barrier section 414 that includes perimeter frame 426 formed by top portion 428, inner end portion 430, outer end portion 432 and bottom portion 434, b) a second barrier section 414 that includes the elongate panel 454, referred to as a second elongate panel, c) a second barrier section 414 that includes horizontal support member 458, horizontal support member 460, vertical support member 462 and vertical member support member 464, d) a second barrier section 414 that includes, as with first elongate panel 454 of barrier section 412, members 458, 460, 462 and inner end portion 420 that form a frame for the second elongate panel 454, e) a second barrier section 414 that includes the free region 490 formed by top portion 418, inner end portion 430, outer end portion 432, and horizontal support member 458, and f) a second barrier section 414 that includes the rigidly affixed guides 437 (whereas first barrier section 412 includes the rigidly affixed guides 436).

Second barrier section 414 further includes a set of eight vertical support members 492 running from bottom portion 434 to horizontal support member 460. Members 492 are disposed between inner end portion 430 and outer end portion 432. Members 492 are equidistantly spaced from each other.

Second barrier section 14 preferably does not include a pet door, such as pet door 468.

When the barrier sections 412, 414 are slid away from each other, the guides 436, 437 in combination work as a stop to prevent further expansion. As the outer end portions 422 and 342 reach a maximum distance apart, the inner edges of top guides 436, 437 will hit each other and the inner edges of bottom guides 436, 437 will hit each other to prevent the barrier sections 412, 414 from sliding further apart. In this fully extended position, the vertically extending inner end portion 420 of the first perimeter frame 416 is disposed outwardly of and spaced apart in the longitudinal direction from the vertically extending inner end portion 430 of the second perimeter frame 426 such that the elongate panel 454 of the first barrier section 412 is spaced apart in the longitudinal direction from the elongate panel 454 of the second barrier section 414.

When the barrier sections 412, 414 are slid toward each other, the inner end of tube 440 will push slide 444 toward outer end portion 432 on inner tube 442 when the drop pin 450 is disengaged. When the outer end of slide 444 hits end portion 432, or a horizontally extending stem running laterally therefrom, the outer end portions 422 and 432 cannot slide any further together such that such is the limitation of contraction or retraction for the barrier 400. In this position, the barrier sections 412, 414 are fully retracted relative to each other. In this fully retracted position, a portion of the elongate panel 454 of the first barrier section 412 slides past all portions of the elongate panel 454 of the second barrier section 414 such that in the fully retracted position the elongate panels 454 are laterally offset from each other. Between the fully extended position and fully retracted position, there is one position where the elongate panel 454 of the first barrier section 412 is perfectly aligned laterally with the elongate panel 454 of the second barrier section 414.

It should be noted that the horizontally and laterally extending stem referred to above spaces and connects inner tube 442 with outer end portion 432 to keep inner tube 442 coaxial with outer tube 440.

The elongate panels 454 of barrier sections 12, 14 have the same height, width and length. Elongate panels 455 of barrier sections 12, 14 have the same height, width and length.

As shown in FIGS. 5A and 5B, the first and second elongate panels 454 are aligned with each other such that, when the first and second barrier sections 412, 414 slide relative to one another, at least a portion of one elongate panel 454 is hidden from view behind the other elongate panel 454 and such that at least a portion of one elongate panel 454 comes face to face with another portion of the other elongate panel 454.

It should be noted that the horizontal and vertical support members of barriers 10, 100, 200, 300 and 400 are formed of metal and are tubular. The perimeter frames, such as frames 16 and 26 of these barriers, are formed of metal and are tubular.

Wood panels or elongate panels or corner panels in the barriers 10, 100, 200, 300 and 400 have a metal frame surrounding the circumference of the panel. The vertical and horizontal components or curved components of the metal frame may or may not be a component of the support members of its respective barrier section.

The pet doors of the barriers 10, 100, 200, 300 and 400 may include latches such that the pet doors can be fixed in the plane of its respective barrier section 12, 102, 202, 302, or 412.

As shown in FIGS. 5A and 5B, the residential barrier 400 includes a first barrier section 412 disposed in generally a first plane; a second barrier section 414 disposed in generally a second plane. The first and second barrier sections 412, 414 are engaged to each other and slideable relative to each other in the first and second planes respectively, and the first and second planes are parallel to each other. The first barrier section 412 includes a first perimeter frame 416. The first perimeter frame 416 includes a first top portion 418, a first inner end portion 420, a first outer end portion 422, and a first bottom portion 424. The second barrier section 414 includes a second perimeter frame 426. The second perimeter frame 426 includes a second top portion 428, a second inner end portion 430, a second outer end portion 432, and a second bottom portion 434. The first outer end portion 422 and first bottom portion 424 of the first barrier section 412 defines a first corner portion. The corner portion is curved. The first barrier section 412 includes a gate or pet door 468 in the first barrier section 412. The gate 468 includes a gate perimeter frame 474. The gate perimeter frame 474 includes gate top portion 476, a gate inner end portion 480, a gate outer end portion 482, and a gate bottom portion 478. The gate 468 is adjacent to the first corner portion of the first barrier section 412.

The gate outer end portion 482 runs adjacent to the first outer end portion 422 of the first barrier section 412. The gate bottom portion 478 runs adjacent to the first bottom portion 424 of the first barrier section 412.

The first barrier section 412 includes a first intermediate horizontal support member 470 running from the first outer end portion 422 of the first perimeter frame 416. The gate top portion 476 runs adjacent to and parallel to the first intermediate horizontal support member 470. The gate bottom portion 478 runs adjacent to and parallel to the first bottom portion 424 of the first barrier section 412.

The first barrier section 412 includes a first intermediate horizontal support member 470 running from the first outer end portion 422 of the first perimeter frame 416. The gate top portion 476 runs adjacent to the first intermediate horizontal support member 470.

The gate 468 is swingable to a front of the first barrier section 412. The gate 468 when swingable to a front of the first barrier section 412 provides a gate opening to the first barrier section 412 to permit a pet to pass through the gate opening. The first barrier section 412 and second barrier section 414 have a fully retracted position where the second barrier section 414 slides adjacent to a rear of the first barrier section 412, and where the second barrier section 414 when the first and second barrier sections 412, 414 are in the fully retracted position closes off a portion of the gate opening such that a remaining portion of the gate opening is open to permit a pet to pass through the remaining portion.

The gate 468 includes a set of support members 484 running between portions 476, 478 of the gate perimeter frame 474.

The support members 484 run vertically between the gate top portion 476 and the gate bottom portion 478 of the gate perimeter frame 474.

One of the support members 484 is an innermost support member and defines an axis on which the gate 468 swings.

One of the support members 484 is an innermost support member and runs parallel to and may, if desired, be spaced apart from an axis on which the gate 468 swings.

A junction between the gate bottom portion 478 and gate outer end portion 482 defines a curve.

A junction between the gate top portion 476 and gate outer end portion 482 defines a right angle. A junction between the gate top portion 476 and gate inner end portion 480 defines a right angle. A junction between the gate inner end portion 480 and gate bottom portion 478 defines a right angle. A junction between the gate bottom portion 478 and gate outer end portion 482 defines a curve.

The gate 468 includes gate vertical support members 484 running between the gate top portion 476 and the gate bottom portion 478. One of the gate vertical support members 484 is a gate innermost support member. The first barrier section 412 includes a gate confronting vertical support member 466 running between two horizontal support members 424, 460 of the first barrier section 412 and confronts the gate innermost support member or gate inner end portion 480. The gate vertical support members 484 and the gate confronting vertical support member 466 are spaced equidistant from each other.

The gate 468 includes a latch 486 that is engagable to the first barrier frame 412. The latch 486 extends from the gate outer end portion 482 to the first outer end portion 422 of the first barrier section 412.

The first and second barrier sections 412, 414 have the same height, width, and length. The second barrier section 414 includes no gate.

The gate 468 is swingable relative to the first barrier section 412. The gate 468 when swingable provides a gate opening to the first barrier section 412 to permit a pet to pass through the gate opening. The first barrier section 412 and second barrier section 414 have an open position where the second barrier section 414 slides adjacent to a rear of the first barrier section 412, and where the second barrier section 414 when said first and second barrier sections 412, 414 are in the open position closes off no portion of the gate opening such that the gate opening is entirely free of the second barrier section 414. The gate 468 is swingable to each of the front and rear of the first barrier section 412 when the first and second barriers 412, 414 are in the open position.

The gate 468 is swingable relative to the first barrier section 412. The gate 468 when swingable provides a gate opening to the first barrier section 412 to permit a pet to pass through the gate opening. The first barrier section 412 and second barrier section 414 have an open position where the second barrier section 414 slides adjacent to a rear of the first barrier section 412, and where the second inner end portion 430 of the second barrier section 414 is inwardly of the gate inner end portion 480 such that the gate opening is free of the second barrier section 414. The gate 468 is swingable to each of the front and rear of the first barrier section 412 when the first and second barrier sections 412, 414 are in the open position.

The first and second barrier sections 412, 414 are fixable incrementally relative to each other. The inner end portion 430 of the second barrier section 414 is fixable incrementally behind the gate opening or gate 468 of the first barrier section 412.

A part or parts from one embodiment may be added to another embodiment. A part or parts from one embodiment may be replaced with a part or parts of another embodiment. In other words, the invention may feature a first part from a first embodiment, a second part from a second embodiment, a third part from a third embodiment, a fourth part from a fourth embodiment, and so on. Features may be interchanged between one or more embodiments.

The residential barrier 400 includes a) a first barrier section 412 disposed in generally a first plane; b) a second barrier section 414 disposed in generally a second plane, with the first and second barrier sections 412, 414 engaged to each other and slideable relative to each other in the first and second planes respectively, with the first and second planes being parallel to each other; c) with the first barrier section 412 including a first perimeter frame 416, with the first perimeter frame 416 including a first perimeter top portion 418, a first perimeter inner end portion 420, a first perimeter outer end portion 422, and a first perimeter bottom portion 424; d) with the second barrier section 414 including a second perimeter frame 426, with the second perimeter frame 426 including a second perimeter top portion 428, a second perimeter inner end portion 430, a second perimeter outer end portion 432, and a second perimeter bottom portion 434; e) with the first perimeter outer end portion 422 and first perimeter bottom portion 424 of the first barrier section 412 defining a first corner portion; f) a gate 468 in the first barrier section 412, wherein the gate is swingable, wherein the gate 468 includes a gate perimeter frame 474 that is swingable with the gate, with the gate perimeter frame 474 including a gate perimeter top portion 476, a gate perimeter inner end portion 480, a gate perimeter outer end portion 482, and a gate perimeter bottom portion 478, and wherein the gate 468 is immediately adjacent to the first corner portion; g) wherein the gate perimeter top portion 476 is spaced from the first perimeter top portion 418 such that the gate 468 has a lesser height than the first barrier section 412; and h) wherein the gate perimeter inner end portion 480 is spaced from the first perimeter inner end portion 420 such that the gate 468 has a lesser length than the first barrier section 412. The residential barrier 400 includes the gate perimeter outer end portion 482 running immediately adjacent to the first perimeter outer end portion 422 of the first barrier section 412, and the gate perimeter bottom portion 478 running immediately adjacent to the first perimeter bottom portion 424 of the first barrier section 412. The residential barrier 400 includes the first barrier section 412 having a first intermediate horizontal support member 470 running from the first perimeter outer end portion 422 of the first perimeter frame 416, wherein the gate perimeter top portion 476 runs immediately adjacent to the first intermediate horizontal support member 470, and wherein the gate perimeter bottom portion 478 runs immediately adjacent to the first perimeter bottom portion 424.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A residential barrier engagable between first and second vertical surfaces, comprising:

a) a first barrier section disposed in generally a first plane;

b) a second barrier section disposed in generally a second plane, with the first and second barrier sections engaged to each other and slideable relative to each other in said first and second planes respectively, with the first and second planes being parallel to each other;

c) wherein the first and second barrier sections are fixable relative to each other at a plurality of incremental positions that are spaced apart incrementally from at least one other position;

d) wherein the first barrier section includes a first perimeter frame, with the first perimeter frame including a first perimeter top portion, a first perimeter inner end portion, a first perimeter outer end portion, and a first perimeter bottom portion;

e) wherein the second barrier section includes a second perimeter frame, with the second perimeter frame including a second perimeter top portion, a second perimeter inner end portion, a second perimeter outer end portion, and a second perimeter bottom portion;

f) wherein the first perimeter outer end portion and first perimeter bottom portion of the first barrier section define a lower left curved corner portion of the first barrier section, wherein the second perimeter outer end portion and second perimeter bottom portion of the second barrier section define a lower right curved corner portion of the second barrier section, wherein the first perimeter outer end portion and first perimeter top portion of the first barrier section define an upper left curved corner portion of the first barrier section, wherein the second perimeter outer end portion and second perimeter top portion of the second barrier section define an upper right curved corner portion of the second barrier section;

g) a gate in the first barrier section, the gate being swingable, wherein the gate includes a gate perimeter frame that is swingable with the gate, with the gate perimeter frame including a gate perimeter top portion, a gate perimeter inner end portion, a gate perimeter outer end portion, and a gate perimeter bottom portion, h) wherein the gate perimeter top portion is spaced from the first perimeter top portion such that the gate has a lesser height than the first barrier section;

i) wherein the gate perimeter inner end portion is spaced from the first perimeter inner end portion such that the gate has a lesser length than the first barrier section; and j) wherein the gate is swingable to a front of the first barrier section, wherein the gate when swingable to a front of the first barrier section provides a gate opening to the first barrier section to permit a pet to pass through the gate opening;

k) wherein the first barrier section and second barrier section have a first position where the second barrier section is spaced from the gate opening such that the gate opening remains open;

l) wherein the first barrier section and second barrier section have a second position where the second barrier section slides adjacent to a rear of the first barrier section from the first position and in said second position closes off a portion of the gate opening such that a remaining portion of the gate opening is open to permit a pet to pass through said remaining portion;

m) wherein the second perimeter inner end portion of the second barrier section is fixable incrementally behind the gate opening of the first barrier section;

n) the first barrier section including an upper bumper and a lower bumper engaged to the first perimeter outer end portion, extending outwardly therefrom, and being spaced from straight lines defined by the first perimeter top portion and the first perimeter bottom portion where the first perimeter top portion is an uppermost perimeter portion of the first barrier section and where the first perimeter bottom portion is a lowermost perimeter portion of the first barrier section, the second barrier section including an upper bumper and a lower bumper engaged to the second perimeter outer end portion, extending outwardly therefrom, and being spaced from straight lines defined by the second perimeter top portion and the second perimeter bottom portion where the second perimeter top portion is an uppermost perimeter portion of the second barrier section and where the second perimeter bottom portion is a lowermost perimeter portion of the second barrier section, the upper and lower bumpers of the first and second barrier sections respectively engaging the first and second vertical surfaces;

o) wherein each of the first and second perimeter frames is tubular and is formed of metal;

p) wherein the first perimeter outer end portion of the first barrier section includes a straight portion that leads into the lower left curved corner portion and upper left curved corner portion of the first barrier section, wherein the second perimeter outer end portion of the second barrier section includes a straight portion that leads into the lower right curved corner portion and upper right curved corner portion of the second barrier section, wherein the first perimeter top portion of the first barrier section includes a straight portion that leads into the upper left curved corner portion of the first barrier section, wherein the second perimeter top portion of the second barrier section includes a straight portion that leads into the upper right curved corner portion of the second barrier section, wherein the first perimeter bottom portion of the first barrier section includes a straight portion that leads into the lower left curved corner portion of the first barrier section, wherein the second perimeter bottom portion of the second barrier section includes a straight portion that leads into the lower right curved corner portion of the second barrier section;

q) wherein the first barrier section includes a horizontal support member disposed intermediate the first perimeter top portion and first perimeter bottom portion and extending from the first perimeter outer end portion, the horizontal support member being adjacent to said gate; and r) wherein the first barrier section includes a vertical support member disposed intermediate the first perimeter outer end portion and the first perimeter inner end portion, the vertical support member traversing the horizontal support member.

2. The residential barrier of claim 1, wherein said gate is spaced from the lower left curved corner portion of the first barrier section.

3. The residential barrier of claim 1, wherein said gate is adjacent to the lower left curved corner portion of the first barrier section.

4. The residential barrier of claim 1, wherein the first barrier section and second barrier section have a third position where the second barrier section slides adjacent to a rear of the first barrier section from said second position and in said third position fully closes off the gate opening.

5. The residential barrier of claim 1, wherein the gate includes corner junctions, and wherein one of the corner junctions is a right angle junction.

6. The residential barrier of claim 1, wherein the gate includes corner junctions, and wherein each of the corner junctions is a right angle junction.

7. The residential barrier of claim 1, wherein the gate includes corner junctions, and wherein one of the corner junctions is a curved junction.

8. The residential barrier of claim 1, wherein the gate perimeter bottom portion runs immediately adjacent to the first perimeter bottom portion of the first barrier section.

9. The residential barrier of claim 1, wherein the first barrier section includes a first intermediate horizontal support member running from the first perimeter outer end portion of the first perimeter frame, and wherein the gate perimeter top portion runs adjacent to the first intermediate horizontal support member.

10. The residential barrier of claim 1, wherein the first barrier section includes a first intermediate horizontal support member running from the first perimeter outer end portion of the first perimeter frame, and wherein the gate perimeter top portion runs immediately adjacent to the first intermediate horizontal support member.

11. The residential barrier of claim 1, wherein the gate includes a set of support members running between portions of the gate perimeter frame.

12. The residential barrier of claim 11, wherein the support members run vertically between the gate perimeter top portion and the gate perimeter bottom portion of the gate perimeter frame.

13. The residential barrier of claim 11, wherein one of the support members is an innermost support member and defines an axis on which the gate swings.

14. The residential barrier of claim 11, wherein one of the support members is an innermost support member and runs parallel to and is spaced apart from an axis on which the gate swings.

15. The residential barrier of claim 1, wherein the gate includes a latch that is engagable to the first barrier frame.

16. A residential barrier, comprising:

a) a first barrier section disposed in generally a first plane;

b) the first barrier section including a first perimeter frame, with the first perimeter frame including a first perimeter top portion, a first perimeter first end portion, a first perimeter second end portion, and a first perimeter bottom portion;

c) the first perimeter second end portion and first perimeter bottom portion of the first barrier section defining a first corner portion of the first barrier section;

d) a gate in the first barrier section, the gate being swingable, wherein the gate includes a gate perimeter frame that is swingable with the gate, the gate perimeter frame including a gate perimeter top portion, a gate perimeter inner end portion, a gate perimeter outer end portion, and a gate perimeter bottom portion, and wherein the gate is immediately adjacent to the first corner portion of the first barrier section;

e) wherein the gate perimeter top portion of the gate is spaced from the first perimeter top portion of the first barrier section such that the gate has a lesser height than the first barrier section;

f) wherein the gate perimeter inner end portion of the gate is spaced from the first perimeter first end portion of the first barrier section such that the gate has a lesser length than the first barrier section;

g) a first junction between a first straight section of the gate perimeter top portion of the gate and a first straight section of the gate perimeter outer end portion of the gate being a right angle junction, a second junction between a second straight section of the gate perimeter top portion of the gate and a first straight section of the gate perimeter inner end portion of the gate being a right angle junction, and a third junction between a second straight section of the gate perimeter inner end portion of the gate and a first straight section of the gate perimeter bottom portion of the gate being a right angle junction;

h) each of the first, second and third junctions of the gate being abutment junctions where the first and second straight sections of the gate directly abut each other;

i) a fourth junction between a second straight section of the gate perimeter bottom portion of the gate and a second straight section of the gate outer end portion of the gate;

j) the fourth junction being adjacent to a piece that extends from the gate perimeter bottom portion of the gate to the first perimeter bottom portion of the first barrier section;

k) wherein the piece is a stop to stop a swinging of the gate relative to the first barrier section;

l) wherein the gate perimeter outer end portion of the gate runs immediately adjacent to the first perimeter second end portion of the first barrier section, wherein the gate perimeter bottom portion of the gate runs immediately adjacent to the first perimeter bottom portion of the first barrier section, and wherein the junction between the gate perimeter outer end portion of the gate and the gate perimeter bottom portion of the gate runs immediately adjacent to a junction between the first perimeter second end portion of the first barrier section and first perimeter bottom portion of the first barrier section;

m) wherein the gate perimeter bottom portion and gate outer end portion of the gate are one-piece with each other such that the junction between the gate perimeter bottom portion and gate outer end portion of the gate is one-piece with each of the gate perimeter bottom portion and gate outer end portion of the gate;

n) the first barrier section including first and second vertical support members aligned vertically with first and second vertical support members of the gate; and o) the first barrier section including an intermediate horizontal support member engaging the first and second vertical support members of the first barrier section, the intermediate horizontal support member being spaced about equidistance between the first perimeter top portion of the first perimeter frame of the first barrier section and the gate perimeter top portion of the gate perimeter frame of the gate.

17. A residential barrier, comprising:

a) a first barrier section disposed in generally a first plane;

b) the first barrier section including a first perimeter frame, with the first perimeter frame including a first perimeter top portion, a first perimeter first end portion, a first perimeter second end portion, and a first perimeter bottom portion;

c) the first perimeter second end portion and first perimeter bottom portion of the first barrier section defining a first corner portion of the first barrier section;

d) a gate in the first barrier section, the gate being swingable, wherein the gate includes a gate perimeter frame that is swingable with the gate, the gate perimeter frame including a gate perimeter top portion, a gate perimeter inner end portion, a gate perimeter outer end portion, and a gate perimeter bottom portion, and wherein the gate is immediately adjacent to the first corner portion of the first barrier section;

e) wherein the gate perimeter top portion of the gate is spaced from the first perimeter top portion of the first barrier section such that the gate has a lesser height than the first barrier section;

f) wherein the gate perimeter inner end portion of the gate is spaced from the first perimeter first end portion of the first barrier section such that the gate has a lesser length than the first barrier section;

g) a first junction between a first straight section of the gate perimeter top portion of the gate and a first straight section of the gate perimeter outer end portion of the gate being a right angle junction, a second junction between a second straight section of the gate perimeter top portion of the gate and a first straight section of the gate perimeter inner end portion of the gate being a right angle junction, and a third junction between a second straight section of the gate perimeter inner end portion of the gate and a first straight section of the gate perimeter bottom portion of the gate being a right angle junction;

h) each of the first, second and third junctions of the gate being abutment junctions where the first and second straight sections of the gate directly abut each other;

i) a fourth junction between a second straight section of the gate perimeter bottom portion and a second straight section of the gate outer end portion;

j) wherein the gate includes a latch that is engagable to the first barrier frame, wherein the latch extends from the gate perimeter frame of the gate to the first perimeter frame of the first barrier section, the latch being pullable inwardly and out of the first perimeter frame of the first barrier section whereupon the gate can be swung to either of a front face or rear face of the first barrier section;

k) wherein the gate perimeter outer end portion of the gate runs immediately adjacent to the first perimeter second end portion of the first barrier section, wherein the gate perimeter bottom portion of the gate runs immediately adjacent to the first perimeter bottom portion of the first barrier section, wherein the junction between the gate perimeter outer end portion of the gate and the gate perimeter bottom portion of the gate runs immediately adjacent to a junction between the first perimeter second end portion of the first barrier section and first perimeter bottom portion of the first barrier section;

l) wherein the gate perimeter bottom portion and gate outer end portion of the gate are one-piece with each other such that the junction between the gate perimeter bottom portion and gate outer end portion of the gate is one-piece with each of the gate perimeter bottom portion and gate outer end portion of the gate;

m) the first barrier section including first and second vertical support members aligned vertically with first and second vertical support members of the gate; and n) the first barrier section including first and second intermediate horizontal support members engaging vertical support members of the first barrier section, the intermediate horizontal support members being spaced apart and intermediate the first perimeter top portion of the first perimeter frame of the first barrier section and the gate perimeter top portion of the gate perimeter frame of the gate.

* * * * *